United States Patent
Shin et al.

(10) Patent No.: US 10,225,054 B2
(45) Date of Patent: Mar. 5, 2019

(54) METHOD AND APPARATUS FOR TRANSMITTING REFERENCE SIGNAL, METHOD AND APPARATUS FOR MEASURING AND REPORTING CHANNEL STATE INFORMATION, AND METHOD FOR CONFIGURING THE SAME

(71) Applicant: Electronics and Telecommunications Research Institute, Daejeon (KR)

(72) Inventors: Wooram Shin, Daejeon (KR); Cheulsoon Kim, Daejeon (KR); Sung-Hyun Moon, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 289 days.

(21) Appl. No.: 14/935,290

(22) Filed: Nov. 6, 2015

(65) Prior Publication Data

US 2016/0142189 A1 May 19, 2016

(30) Foreign Application Priority Data

Nov. 7, 2014 (KR) .................. 10-2014-0154770
Aug. 13, 2015 (KR) .................. 10-2015-0114929
(Continued)

(51) Int. Cl.
 *H04W 4/00* (2018.01)
 *H04L 5/00* (2006.01)
 *H04B 7/06* (2006.01)

(52) U.S. Cl.
 CPC ......... *H04L 5/0048* (2013.01); *H04B 7/0626* (2013.01)

(58) Field of Classification Search
 CPC ...................... H04L 5/0048; H04B 7/0626
 (Continued)

(56) References Cited

U.S. PATENT DOCUMENTS

2013/0258964 A1  10/2013  Nam et al.
2014/0314041 A1  10/2014  Kim et al.
(Continued)

FOREIGN PATENT DOCUMENTS

KR  1020140099868 A  8/2014
KR  1020140100148 A  8/2014
(Continued)

OTHER PUBLICATIONS

"Potential CSI-RS and CSI feedback enhancements for EBF/FD-MIMO," 3GPP TSG RAN WG1 Meeting #79, Nov. 17-21, 2014, pp. 1-6.
(Continued)

*Primary Examiner* — Sai Ming Chan
(74) *Attorney, Agent, or Firm* — William Park & Associates Ltd.

(57) ABSTRACT

A method in which a base station transmits a CSI (channel state information)-RS (reference signal) in a MIMO (multiple input multiple output) antenna system is provided. The base station periodically transmits a CSI-RS for first CSI to a terminal. The base station requests the terminal to transmit second CSI in a first subframe. When a CSI-RS occasion is configured, the base station transmits a CSI-RS for the second CSI to the terminal for a duration of the CSI-RS occasion from a second subframe or to the second subframe, which is a subframe after a first offset configured for CSI-RS transmission from the first subframe.

16 Claims, 8 Drawing Sheets

< In case where CSI-RS is configured >

< In case where CSI-RS occasion is configured, and, in N consecutive DL suframes from (n1+k1)-th DL suframe, CSI-RS is transmitted >

(30) Foreign Application Priority Data

Sep. 25, 2015 (KR) .......................... 10-2015-0137044
Nov. 6, 2015 (KR) .......................... 10-2015-0156025

(58) Field of Classification Search
USPC .......................................................... 370/329
See application file for complete search history.

(56) References Cited

U.S. PATENT DOCUMENTS

| | | |
|---|---|---|
| 2014/0321374 A1 | 10/2014 | Kim et al. |
| 2014/0334356 A1 | 11/2014 | Kim et al. |
| 2015/0124736 A1 | 5/2015 | Ko et al. |
| 2015/0139112 A1 | 5/2015 | Park et al. |
| 2015/0146618 A1 | 5/2015 | Ko et al. |

FOREIGN PATENT DOCUMENTS

| | | | |
|---|---|---|---|
| KR | 1020140144261 A | 12/2014 | |
| KR | 1020150032525 A | 3/2015 | |
| KR | 1020150035705 A | 4/2015 | |

OTHER PUBLICATIONS

"CSI feedback enhancements for EBF/FD-MIMO," 3GPP TSG RAN WG1 Meeting #80, Feb. 9-13, 2015, pp. 1-3.
"CSI feedback enhancements," 3GPP TSG RAN WG1 Meeting #80bis, Apr. 20-24, 2015, pp. 1-4.
"Feedback enhancements for beamformed CSI-RS based schemes," 3GPP TSG RAN WG1 Meeting #81, May 25-29, 2015, pp. 1-4.

< In case where CSI-RS occasion is configured, and, in N consecutive DL suframes from (n1+k1)-th DL suframe, CSI-RS is transmitted >

< In case where CSI-RS occasion is configured, and, in N consecutive
DL suframes to (n1+k1)-th DL suframe, CSI-RS is transmitted >

METHOD AND APPARATUS FOR TRANSMITTING REFERENCE SIGNAL, METHOD AND APPARATUS FOR MEASURING AND REPORTING CHANNEL STATE INFORMATION, AND METHOD FOR CONFIGURING THE SAME

CROSS-REFERENCE TO RELATED APPLICATION

This application claims priority to and the benefit of Korean Patent Application Nos. 10-2014-0154770, 10-2015-0114929, 10-2015-0137044 and 10-2015-0156025 filed in the Korean Intellectual Property Office on Nov. 07, 2014, Aug. 13, 2015, Sep. 25, 2015 and Nov. 6, 2015, the entire contents of which are incorporated herein by reference.

BACKGROUND OF THE INVENTION (a) Field of the Invention

The present invention relates to a method and an apparatus for transmitting a reference signal, a method and an apparatus for measuring and reporting channel state information, and a method of configuring the same.

(b) Description of the Related Art

A full-dimensional (FD) multiple input multiple output (MIMO) transmission adaptively forms a beam for the horizontal domain/direction or azimuth domain/direction (hereinafter collectively referred to as 'horizontal domain') and the vertical domain/direction, zenith domain/direction, or elevation domain/direction (hereinafter collectively referred to as 'vertical domain') by using a 2D antenna array, thereby enabling an improvement of spectral efficiency, a reduction in inter-cell interference, an improvement of a cell coverage, etc.

For the FD-MIMO transmission, like the current MIMO transmission that adaptively forms the beam only for the horizontal domain, a base station or a relay station must receive a report (or feedback, hereinafter collectively referred to as 'report') of channel state information (CSI) including a rank indicator (RI), a channel quality indicator (CQI), a precoding matrix indicator (PMI), positions of M selected subbands (or preferred subbands, hereinafter collectively referred to as 'selected subbands'), etc. from a terminal.

Meanwhile, the terminal must acquire a MIMO channel for measurement of the CSI. If the base station configures a reference signal (CSI-RS) or a non-zero power (NZP) CSI-RS, and accordingly transmits the CSI-RS, the terminal receives the CSI-RS and estimates the MIMO channel. The base station may configure energy per resource element (EPRE) of the CSI-RS in consideration of performance of channel estimation using the CSI-RS, inter-cell interference due to the transmission of the CSI-RS, etc. If the terminal measures the above-described various types of CSI (for example, the RI, the CQI, the PMI, the selected subbands, etc.) by using the channel estimated from the CSI-RS and reports the measured CSI to the base station, the base station performs scheduling (or resource allocation) including link adaptation by using the CSI. The CSI-RS transmission described below may mean that the base station transmits the CSI-RS to the terminal, and includes the terminal receiving the CSI-RS from the base station. The CSI report described below may mean that the terminal transmits the measured CSI to the base station, and includes the base station receiving the CSI from the terminal. The 'current standard' indicated below means the current standard of the $3^{rd}$ generation partnership project (3GPP) long term evolution (LTE) Release 12.

The CSI-RS is a downlink reference signal transmitted by the base station for the purpose of measuring a channel necessary for the terminal to measure a downlink CSI, and was introduced in the 3GPP LTE Release 10. The CSI-RS is also referred to as an NZP CSI-RS in order to distinguish the CSI-RS and a zero-power (ZP) CSI-RS that will be described later. Although a 3GPP LTE Release 8/9 system has used a cell-specific reference signal (CRS) in order for the terminal to measure the CSI, an introduction of a new reference signal for estimating a channel having a lower density than the existing CRS in order to support downlink transmission of a maximum of 8 layers has been required from the 3GPP LTE Release 10.

The terminal is configured with the CSI-RS through user equipment (UE)-specific radio resource control (RRC) signaling. Numbers of CSI-RS antenna ports with which the terminal may be configured are 1, 2, 4, and 8. The CSI-RS is transmitted in the entire region of a system bandwidth. Two resource elements (REs) are used per physical resource block (PRB) pair for the CSI-RS transmission of each of the CSI-RS antenna ports. Code division multiplexing (CDM) is performed on 2 CSI-RS antenna ports across 2 REs that are located in two consecutive orthogonal frequency division multiplexing (OFDM) symbols (or that are apart from one OFDM symbol) on the same subcarrier, and thus the 2 CSI-RS antenna ports have density of 1 RE/CSI-RS antenna port. A transmission period in a time axis of the CSI-RS may be configured as 5, 10, 20, 40, or 80 ms. Mapping of the REs on which the CSI-RS is transmitted follows a pattern defined by a configuration parameter (CSI-RS configuration) for each antenna port.

An interference measurement (CSI-IM) resource are a resource for measuring interference necessary for the terminal to measure the CSI, and was introduced in the 3GPP LTE Release 11. Positions of REs in the PRB pair for CSI-IM are indicated through a CSI-RS configuration parameter corresponding to 4 CSI-RS antenna ports. A transmission period in a time axis of CSI-IM may be configured as 5, 10, 20, 40, or 80 ms, like the NZP CSI-RS.

It is assumed that in a case where the terminal performs physical downlink shared channel (PDSCH) rate matching, the PDSCH is not mapped to an RE configured as a ZP CSI-RS. The ZP CSI-RS may be largely used for the following two purposes. First, the base station does not transmit (or performs muting on) a signal in an RE on which the CSI-RSs of adjacent cells are transmitted, thereby improving CSI-RS measurement performance of the terminal in the adjacent cells. Hereat, the base station may inform the terminal of REs to which muting is applied through the ZP CSI-RS configuration. Second, ZP CSI-RS may be configured for the purpose of configuring resources for interference signal measurement of the terminal. The terminal may be configured with CSI-IM resources used to measure an interference signal only in a ZP CSI-RS resource region.

SUMMARY OF THE INVENTION

The present invention has been made in an effort to provide a method and an apparatus for transmitting a CSI-RS necessary for CSI measurement for FD-MIMO transmission. The present invention has been made in an effort to provide a method and an apparatus for measuring and reporting a CSI by using a CSI-RS when the CSI-RS is received.

An exemplary embodiment of the present invention provides a method in which a base station transmits a CSI (channel state information)-RS (reference signal) in a MIMO (multiple input multiple output) antenna system. The method includes: periodically transmitting a CSI-RS for first CSI to a terminal; requesting the terminal to transmit second CSI in a first subframe; and when a CSI-RS occasion is configured, transmitting a CSI-RS for the second CSI to the terminal for a duration of the CSI-RS occasion from a second subframe or to the second subframe, which is a subframe after a first offset configured for CSI-RS transmission from the first subframe.

The first CSI may be CSI for one of a horizontal domain and a vertical domain, and the second CSI may be CSI for the other one.

The requesting of the terminal to transmit the second CSI may include, when it is determined that at least one of update for the second CSI and feedback for the second CSI is necessary, requesting the terminal to transmit the second CSI.

The requesting of the terminal to transmit the CSI-RS for the second CSI may include: receiving a transmission request of the CSI-RS for the second CSI from the terminal in a third subframe; and requesting the terminal to transmit the second CSI in the first subframe that is a subframe after a second offset configured for CSI-RS transmission from the third subframe.

The receiving of the transmission request of the CSI-RS for the second CSI may include receiving the transmission request of the CSI-RS for the second CSI from the terminal through at least one of a PUCCH (physical uplink control channel) and a MAC (medium access control) CE (control element).

The transmission request of the CSI-RS for the second CSI may be transmitted from the terminal when a value of at least one of RSRP (reference signal received power), an RSSI (received signal strength indicator), RSRQ (reference signal received quality), and a CQI (channel quality indicator) or a variation degree of the value exceeds a threshold value.

The transmitting of the CSI-RS for the second CSI may include configuring a CSI-RS transmission resource for the second CSI such that the CSI-RS for the second CSI is not transmitted in a subframe in which the CSI-RS for the first CSI is transmitted or the CSI-RS transmission resource for the second CSI does not overlap with a CSI-RS transmission resource for the first CSI.

The method may further include configuring interconnection (or interrelation) information between a periodic CSI report of the terminal and a aperiodic CSI report of the terminal in the terminal through signaling between the base station and the terminal.

CSI measurement for the aperiodic CSI report of the terminal may be performed by the terminal configured with interconnection information, based on CSI measurement for the periodic CSI report of the terminal.

Another embodiment of the present invention provides a method in which a base station configures a terminal with measurement and report of CSI (channel state information) in a MIMO (multiple input multiple output) antenna system. The method may include: grouping a plurality of CSI-RS antenna ports and generating a plurality of CSI-RS antenna port groups; when a CSI report on a first CSI-RS antenna port group among the plurality of CSI-RS antenna port groups is to be requested to the terminal, including information indicating the first CSI-RS antenna port group in a CSI request field of a DL (downlink) DCI (downlink control information) format; and requesting a aperiodic CSI report from the terminal by using the CSI request field of the DCI.

The method may further include, when a CSI report on at least one domain of a horizontal domain and a vertical domain is to be requested to the terminal, including information corresponding to the at least one domain in the CSI request field of the DL DCI format.

The method may further include, when the terminal is made to measure second domain CSI among first domain CSI and the second domain CSI on condition of the first domain CSI, configuring a first CSI process for the first domain CSI as a reference CSI process among the first CSI process and a second CSI process for the second domain CSI, and informing the terminal of a process identifier indicating the first CSI process as information of the reference CSI process.

The first domain CSI may be one of horizontal domain CSI and vertical domain CSI, and the second domain CSI may be the other one of the horizontal domain CSI and the vertical domain CSI.

The configuring of the first CSI process as the reference CSI process may include configuring the reference CSI process for one first CSI measurement subframe set in the terminal, and configuring the second CSI process for a plurality of second CSI measurement subframe sets in the terminal.

The second domain CSI for the plurality of second CSI measurement subframe sets may be measured by the terminal on condition of the first domain CSI for the first measurement subframe set, which is measured through the reference CSI process.

The configuring of the first CSI process as the reference CSI process may include configuring the reference CSI process for a plurality of CSI measurement subframe sets and the second CSI process for the plurality of CSI measurement subframe sets in the terminal.

The second domain CSI for each of the plurality of CSI measurement subframe sets may be measured by the terminal on condition of the first domain CSI for each of the plurality of CSI measurement subframe sets, which is measured through the reference CSI process.

Yet another embodiment of the present invention provides a method in which a base station configures a terminal with a CSI (channel state information) process in a MIMO (multiple input multiple output) antenna system. The method may include: when a plurality of CSI-RS (reference signal) antenna ports are operated in a first CSI-RS mode to have the same beam width and direction, including a plurality of first identifiers indicating a plurality of CSI-RS resource configurations and a second identifier indicating one CSI-IM (interference measurement) resource configuration in one piece of first CSI process configuration information; configuring the first CSI process configuration information to the terminal; and receiving CSI measured according to the first CSI process configuration information from the terminal.

Numbers of a plurality of CSI-RS antenna ports included in a plurality of CSI-RS resources corresponding to the plurality of first identifiers may be provided by the terminal according to an order of the plurality of first identifiers that are included in the first CSI process configuration information or values of the plurality of first identifiers.

The method may further include: when all or some of the plurality of CSI-RS antenna ports are operated in a second CSI-RS mode to have different beam directions, including a plurality of third identifiers indicating a plurality of CSI-RS resource configurations and a plurality of fourth identifiers indicating a plurality of CSI-IM resource configurations in one piece of second CSI process configuration information; configuring the second CSI process configuration information in the terminal; and receiving CSI measured according to the second CSI process configuration information from the terminal.

The method may further include: selecting one of the first CSI-RS mode and the second CSI-RS mode; and including information indicating the selected mode in configuration information corresponding to the selected mode among the first CSI-RS process configuration information and the second CSI-RS process configuration information.

When all or some of the plurality of CSI-RS antenna ports are operated in the second CSI-RS mode, the terminal may assume that QCL (quasi co-location) with respect to a Doppler shift, a Doppler spread, an average delay, and a delay spread is satisfied between a DM (demodulation)-RS antenna port and a first CSI-RS antenna port among the plurality of CSI-RS antenna ports.

The first CSI-RS antenna port is a CSI-RS antenna port that belongs to a CSI-RS resource indicated by a first identifier selected by the terminal among the plurality of third identifiers.

When all or some of the plurality of CSI-RS antenna ports are operated in the second CSI-RS mode, the terminal may assume that QCLs with respect to at most four of a Doppler shift, a Doppler spread, an average delay, and a delay spread is satisfied between a first DM-RS antenna port and a first CSI-RS antenna port among the plurality of CSI-RS antenna ports.

The first CSI-RS antenna port may be a CSI-RS antenna port that belongs to a CSI-RS resource indicated by a third identifier selected by the terminal among the plurality of third identifiers for a CSI process corresponding to QCL information with which the terminal is configured through physical layer signaling from the base station for receiving a PDSCH (physical downlink shared channel).

The first DM-RS antenna port may be a DM-RS antenna port that belongs to a PDSCH transmission resource allocated by a DL DCI format including the QCL information.

Each of the plurality of third identifiers and each of the plurality of fourth identifiers may form a pair according to an order of the plurality of third identifiers and the plurality of fourth identifiers that are included in the second CSI process configuration information.

The terminal may measure channels for a plurality of beams by using CSI-RSs of a plurality of CSI-RS antenna ports corresponding to the plurality of third identifiers, measure interferences for the plurality of beams in resources defined for a plurality of CSI-RS antenna ports corresponding to the plurality of fourth identifiers that form pairs with the plurality of third identifiers, select at least one of the plurality of beams by using the measured channels and interferences, and measure CSI for each of the at least one selected beam.

The receiving of the CSI measured according to the second CSI process configuration information may include: when the at least one selected beam is a single beam, receiving a third identifier corresponding to the selected beam among the plurality of third identifiers from the terminal along with CSI for the selected beam; and when the at least one selected beam is a plurality of beams, receiving a bitmap indicating third identifiers corresponding to the selected beams among the plurality of third identifiers from the terminal along with CSI for the selected beams.

DETAILED DESCRIPTION OF THE EMBODIMENTS

Figure 1A:
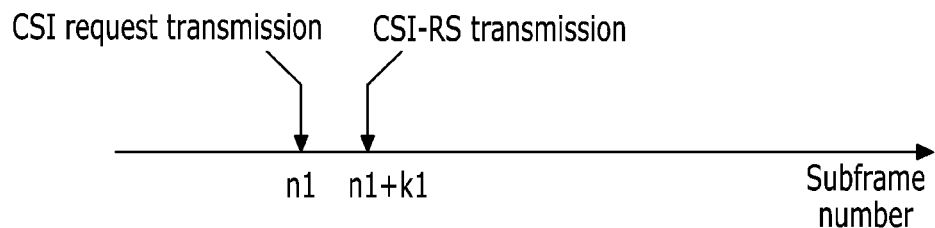
FIGS. 1A, 1B, and 1C are diagrams for describing a method of transmitting a CSI-RS in connection with a CSI request according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, a terminal may be referred to as a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include all or some of the functions of the terminal, the MT, the MS, the AMS, the HR-MS, the SS, the PSS, the AT, the UE, or the like.

In addition, the base station (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay node (RN) functioning as the base station, a high reliability relay station (HR-RS) functioning as the base station, a repeater, a macro base station, a small base station, etc., and may include all or some of the functions of the BS, the ABS, the HR-BS, the nodeB, the eNodeB, the AP, the RAS, the BTS, the MMR-BS, the RN, the HR-RS, the repeater, the macro base station, the small base station, or the like.

1. 2D Antenna Array Virtualization Method

CSI items that are to be measured by a terminal and reported to a base station may include an RI, a PMI, a CQI, and a selected subband index (indexes). In a case where the base station generally transmits a signal (or a physical channel, hereinafter collectively referred to as 'signal') to the terminal, a MIMO channel over the radio may be expressed as a matrix having rows of as many as the number of receiving antennas of the terminal and columns of as many as the number of transmitting antennas of the base station. An element of the i-th row and the j-th column of the MIMO channel matrix is a channel value of between the i-th receiving antenna (or antenna element or radiation element) and the j-th transmitting antenna (or antenna element or radiation element).

Meanwhile, the base station may have two virtualization processes between an antenna element (or a radiation element, hereinafter collectively referred to as 'antenna element') constituting a transmitting antenna array and an antenna port (AP) that is a logical multiple input unit of a baseband for signal transmission.

A signal of each antenna port is input to a single transceiver unit (TXRU) or a plurality of transceiver units through the antenna port virtualization process, and undergoes an intra-TXRU process. The above-processed signal of each TXRU is input to a single antenna element or a plurality of antenna elements (or a unit including an antenna element, hereinafter collectively referred to as 'antenna element') through a TXRU virtualization process. Signals processed to antenna elements are transmitted through a wireless channel.

An example of an antenna port virtualization method is a method of multiplying a signal of the single antenna port or each of the plurality of antenna ports by a weight value having magnitude and/or phase and inputting a signal obtained by summing signals of the single antenna port or each of the plurality of antenna ports, which is multiplied by the weight value, to a TXRU. Herein, the signal of the antenna port may be virtualized as a single TXRU or a plurality of TXRUs. One TXRU may be input by a signal that is virtualized after being output from the single antenna port and the plurality of antenna ports.

An example of a TXRU virtualization method is a method of multiplying an output signal of the single TXRU or each of the plurality of TXRUs by a weight value having magnitude and/or phase and inputting a signal obtained by summing output signals of the single TXRU or the plurality of TXRUs, which is multiplied by the weight value, to an antenna element. Herein, the output signal of the TXRU may be virtualized as the single antenna element or each of the plurality of antenna elements. One antenna element may be input by a signal that is virtualized after being output from the single TXRU and the plurality of TXRUs.

Each antenna port may be virtualized to each antenna element and transmitted to the terminal, and may form a beam in a specific direction through virtualization. According to a virtualization method, beams of all antenna ports may be formed in the same direction or in different directions, or the same beam may be formed between some antenna ports. Beamforming or precoding may be performed in a baseband in consideration of an effective MIMO channel having an antenna port of the base station as an input and a receiving antenna (or a receiving antenna port, hereinafter collectively referred to as 'receiving antenna') of the terminal as an output. In a case where different virtualization methods are applied, the effective MIMO channel in the baseband may have different values while a wireless channel stays the same.

The above-described virtualization method may include the following two methods (a method M100 and a method M101).

The method M100 is a virtualization method in which each antenna port has different transmission vertical directions and/or different transmission horizontal directions. Herein, a vertical direction may be replaced with a zenith angle, an elevation angle, a vertical angle, or a tilt angle, and a horizontal direction may be replaced with an azimuth angle, a horizontal angle, or a bearing angle.

The method M101 is a virtualization method in which all antenna ports have the same transmission vertical direction and/or the same transmission horizontal direction.

The method M100 virtualizes each antenna port to have different transmission vertical directions and/or different transmission horizontal directions (hereinafter 'transmission vertical direction and/or transmission horizontal direction' are referred to as 'transmission direction'), and thus the terminal may receive signals having a great magnitude difference from each antenna port. Therefore, the method M100 is suitable for a case where a beam is formed using some antenna ports having a receiving signal of a great magnitude or for a case where respective antenna ports corresponding to candidate beams are transmitted such that the terminal selects an optimal beam. For example, on the assumption that the base station configures 4 antenna ports in the vertical domain, a signal magnitude of each CSI-RS antenna port (hereinafter referred to as 'CSI-RS AP') received by an arbitrary terminal may have an order such as CSI-RS AP 1>CSI-RS AP 0≈CSI-RS AP 2>CSI-RS AP 3. It may be efficient for the base station to transmit a signal through CSI-RS AP 1 for the arbitrary terminal. Meanwhile, the method M101 virtualizes each antenna port to have the same transmission direction, and thus the terminal may receive signals having a small magnitude difference from each antenna port. Therefore, the method M101 is suitable for a beamforming transmission method using all antenna ports.

Meanwhile, the above-described virtualization methods (for example, the method M100 and the method M101) may be UE-specifically or UE-group-specifically used.

The above-described virtualization method may be transparently used from the perspective of the terminal. That is, the terminal may perform a series of processes such as CSI-RS receiving and channel estimating, CSI measuring and reporting, and PDSCH receiving, irrespective of which virtualization method is applied or without information relating to the applied virtualization method.

2. CSI-RS Transmission, a Method of Configuring the CSI-RS Transmission, and other Related Methods As described above, in order for a terminal to acquire a channel between each antenna port of the base station and receiving antenna, the terminal must receive a CSI-RS from a base station and estimate a channel from the CSI-RS. Hereat, the terminal estimates the channel from an antenna port configured as a CSI-RS AP by the base station among antenna ports that may be configured by the base station, measures a CSI using the channel, and reports the CSI to the base station. For example, it is assumed that the base station may configure 4 antenna ports from the perspective of the base station. If the base station configures only 2 antenna ports as CSI-RS APs and transmits a signal to a terminal A1, the terminal A1 may estimate a channel on the 2 CSI-RS APs and measure and report CSI by using the channel. If the base station configures all 4 antenna ports as CSI-RS APs and transmits the signal to a terminal B1, the terminal B1 may estimate a channel on the 4 CSI-RS APs and measure and report CSI by using the channel.

Meanwhile, in a case where the base station includes many antenna ports, beams may be elaborately formed, and thus intra-cell interference and inter-cell interference may be reduced, thereby improving system performance. However, accordingly, the base station must also increase the number of CSI-RS APs, and thus the base station reduces the number of resources (or REs) that can transmit data, thereby reducing a degree of system performance improvement. Therefore, a CSI-RS transmission method capable of reducing overhead of CSI-RS while maintaining accuracy of CSI reported to the base station is necessary. It may be impossible to allocate many additional CSI-RS resources (or REs) to one transmission time interval (TTI) or one subframe by avoiding an RE corresponding to a control channel region including CRS, UE-RS (UE-specific reference signal), DM-RS (demodulation reference signal), PRS (positioning reference signal), MBSFN (multicast broadcast single frequency network) RS, PCFICH (physical control format indicator channel), PDCCH (physical downlink control channel), and PHICH (physical hybrid-ARQ indicator channel) that are used in the current 3GPP LTE Release 12 standard (including the 3GPP LTE Release 8 standard to the 3GPP LTE Release 12 standard), and thus a CSI-RS transmission method for resolving this is also necessary.

A CSI-RS transmission method related to a downlink (DL) subframe (or DL TTI, hereinafter 'subframe to which a signal of a CSI-RS AP is transmitted' is referred to as a 'CSI-RS subframe') in which a signal of a CSI-RS AP is transmitted may include the following methods (a method M200 and a method M201).

The method M200 is a method of transmitting signals of all CSI-RS APs in one CSI-RS subframe. The method M201 is a method of grouping CSI-RS APs and transmitting signals of the CSI-RS APs that belong to each CSI-RS group (hereinafter referred to as 'CSI-RS APG') in different CSI-RS subframes for each CSI-RS APG.

In the method M201, the size of each CSI-RS APG (or a CSI-RS AP subset, hereinafter collectively referred to as 'CSI-RS APG') may be different. In the method M201, CSI-RS APs that belong to all CSI-RS APGs may not configure all CSI-RS APs. In this case, the method M201 may include a method M201-1A.

The method M201-1A is a method of transmitting a CSI-RS by configuring CSI-RS APs for antenna ports that are aligned in the horizontal domain and belong to one row as one CSI-RS APG and configuring CSI-RS APs for antenna ports that are aligned in the vertical domain and belong to one column as another CSI-RS APG. As a CSI-RS configuration method for the method M201-1A, in a case where the base station configures each CSI-RS APG, the method includes antenna port array domain information including at least the horizontal domain and the vertical domain in higher-layer signaling transmitted to configure a terminal related to the antenna port array domain information.

The method M201 may include the following two methods (a method M201-2A and a method M201-2B) as the CSI-RS configuration method.

The method M201-2A is a method of configuring a plurality of CSI-RS APGs using a plurality of CSI processes. The method M201-2B is a method of configuring a plurality of CSI-RS APGs using a plurality of CSI-RS occasions.

The method M201-2A is a method of configuring CSI-RS APs that belong to each CSI-RS APG by using a plurality of CSI processes supported by the base station in the current standard through CSI-RS-ConfigNZP (or NZP CSI-RS resource configuration) corresponding to csi-RS-ConfigN-ZPId (or NZP CSI-RS resource configuration ID) of each CSI process.

In a case where the method M201-1A is configured using the method M201-2A, 2 CSI processes are configured. One of the two CSI processes may configure a CSI-RS APG for the horizontal domain, and a CSI-RS APG for the vertical domain may be configured by using an NZP CSI-RS of another CSI process. In a case where the method M201-2A is used for the method M201-1A, array domain information of corresponding NZP CSI-RS APs may be included in CSI-Process information elements (IEs) or CSI process configuration information, and may include at least information regarding the horizontal domain and the vertical domain. To measure and report CSI under an assumption that PDSCH is transmitted through NZP CSI-RS APs corresponding to all or some CSI processes of the plurality of CSI processes, connection/association information between the CSI processes may be included in a CSI process or CSI-RS configuration. The terminal may use the information to simultaneously or interdependently measure CSI for a plurality of connected CSI processes. In a case where CSI-RS is configured for the method M201-1A as an example, the base station may configure connection for two CSI processes corresponding to the horizontal and vertical domains by using connection information. Meanwhile, in order to measure interference for the plurality of connected CSI processes in an equal status, the base station may configure csi-IM-ConfigId (or the CSI-IM resource configuration ID) for the plurality of CSI processes in the same manner such that the plurality of CSI processes have the same CSI-IM configuration or may configure csi-IM-ConfigId (or the CSI-IM resource configuration ID) corresponding to CSI-IM having the same CSI-RS subframe configuration for the plurality of CSI processes.

In the method M201-2B, to perform one CSI-RS resource configuration for a plurality of CSI-RS APGs, a discovery reference signal (DRS) occasion configuration concept applied to small cell enhancement (SCE) may be employed. For convenience of description, the DRS occasion configuration concept is referred to as CSI-RS occasion configuration. The CSI-RS occasion configuration may include at least each CSI-RS subframe configuration in which a plurality of CSI-RS APGs may be transmitted. The CSI-RS occasion configuration may further include a CSI-RS occasion repeating period, offset information, and CSI-RS resource configuration. For CSI-RS APG configuration in CSI-RS occasion, the CSI-RS occasion configuration may further include the number of CSI-RS APGs, a CSI-RS APG ID of each CSI-RS APG, the number of CSI-RS APs, CSI-RS transmission resources, and the array domain information described in the method M201-2A. In addition, the CSI-RS occasion configuration may further include CSI-IM resource configuration or the CSI-IM resource configuration ID (for example, csi-IM-ConfigId) for measurement of interference in the CSI-RS occasion.

Meanwhile, a method in which an antenna port to which virtualization is applied to have different transmission directions transmits CSI-RS may include the following methods (a method M210 and a method M211).

The method M210 is a method in which the base station transmits signals of CSI-RS APs for all antenna ports in each CSI-RS subframe irrespective of a transmission direction. The method M211 is a method in which the base station transmits signals of CSI-RS APs for antenna ports having the same transmission direction in the same CSI-RS subframe.

In the method M210, the base station transmits the signals of the CSI-RS APs for all antenna ports in each CSI-RS subframe irrespective of the transmission direction. For example, it is assumed that the base station configures 4 antenna ports (for example, antenna ports 0~3) such that the antenna ports 0 and 1 have a tilting angle of 102 degrees and the antenna ports 2 and 3 have a tilting angle of 90 degrees. In this case, according to the method M210, signals of 4 CSI-RS APs may be transmitted in the CSI-RS subframe.

The method M211 is a method in which only the antenna ports having the same transmission direction transmit a signal of each CSI-RS AP in the same CSI-RS subframe. If the same assumption as an example for the above-described method M210 is applied to the method M211, CSI-RSs on the antenna ports 0 and 1 are transmitted in one CSI-RS subframe through 2 CSI-RS APs and CSI-RSs on the antenna ports 2 and 3 are transmitted in another CSI-RS subframe through 2 CSI-RS APs.

A method of transmitting signals of antenna ports having different transmission directions according to the method M211 in different CSI-RS subframes may include the following two methods (a method M211-1A and a method 211-1B).

The method M211-1A is a method in which the base station configures CSI-RS subframe configurations of as many as the number of different transmission directions, and transmits a signal of a CSI-RS AP of a corresponding transmission direction in a corresponding CSI-RS subframe.

The method M211-1B is a method in which the base station configures one CSI-RS subframe configuration, applies different virtualization methods in each CSI-RS subframe according to a corresponding transmission direction, and transmits CSI-RS. The method M211-1B may be divided into the following two methods (a method M211-1B-1 and a method M211-1B-2) according to whether the base station transmits virtualization configuration information to the terminal.

The method M211-1B-1 is a method in which the base station uses virtualization without transmitting the virtualization configuration information to the terminal. The method M211-1B-2 is a method in which the base station uses virtualization by informing the terminal of the virtualization configuration information.

The method M211-1B-2 may define a virtualization pattern in informing the terminal of the virtualization configuration information by the base station. Herein, the virtualization pattern may include information indicating a virtualization weight applied to each CSI-RS subframe or information indicating a transmission direction according to virtualization. To define the virtualization pattern, the base station may include the number of CSI-RS subframes as length information and a virtualization indicator (VI) applied to each of CSI-RS subframes which are as many as the length of the virtualization pattern information. The base station may configure the terminal with the virtualization pattern information through high-layer signaling and/or physical layer signaling, and change and reconfigure the virtualization pattern information. To reduce signaling overhead in a case where the base station reconfigures the virtualization pattern information, the base station may define a virtualization pattern set configured as a predetermined number of virtualization patterns and transmit only an indicator (or an identifier) of a corresponding virtualization pattern. The base station may include at least a virtualization pattern set size, the virtualization pattern information of as much as the virtualization pattern set size (that may be the number of the CSI-RS subframes), and virtualization pattern indicators in virtualization pattern set information.

A CSI-RS transmission method according to periodicity or instantaneity of CRS-RS transmission may include the following three methods (a method M220, a method M221, and a method M222).

The method M220 is a method in which the base station periodically transmits CSI-RS. The method M221 is a method in which the base station instantaneously transmits CSI-RS. When the base station instantaneously transmits CSI-RS, instantaneity may correspond to the perspective of the terminal. That is, although the base station periodically transmits CSI-RS in view of a system, the base station may configure the CSI-RS to allow one terminal to assume that the corresponding CSI-RS is instantaneously transmitted in view of the corresponding terminal.

The method M222 is a method in which the base station additionally transmits CSI-RS instantaneously as necessary while periodically transmitting CSI-RS.

In the current standard, the base station configures CSI-RS subframe configuration including the CSI-RS transmission period and offset to each terminal through high-layer signaling, and accordingly transmits CSI-RS periodically. This corresponds to a method (hereinafter referred to as 'method M220-1A') as a combination of the method M200 and the method M220.

A method (hereinafter referred to as 'method M220-1B') as a combination of the method M201 and the method M220 may also be used. If an application of the method M201-2B is considered for the method M201, the base station may configure the CSI-RS occasion period and offset information to the terminal through higher-layer signaling, and accordingly transmit signals of CSI-RS APGs that belong to a corresponding CSI-RS APG in each CRI-RS subframe in a CSI-RS occasion every period of the CSI-RS occasion. If an application of the method M201-2A is considered for the method M201, the base station may configure a transmission period of a corresponding CSI-RS and offset to the terminal through CSI-RS subframe configuration of configuration of NZP CSI-RSs that belong to each CSI process. Herein, the base station may configure different transmission periods of CSI-RS APGs through configuration of NZP CSI-RSs that belong to each CSI process. For example, the base station may configure a shorter transmission period of a horizontal domain CSI-RS APG than a transmission period of a vertical domain CSI-RS APG in order to reduce overhead due to CSI-RS transmission.

The method M221 is a method in which the base station instantaneously transmits CSI-RS and may include the following two methods (a method M221-1A and a method M221-1B). The method M221-1A is a method in which the base station transmits CSI-RS in connection with a CSI request of the base station. The method M221-1B is a method in which the base station transmits CSI-RS in response to a CSI-RS transmission request of the terminal.

Figure 1B:
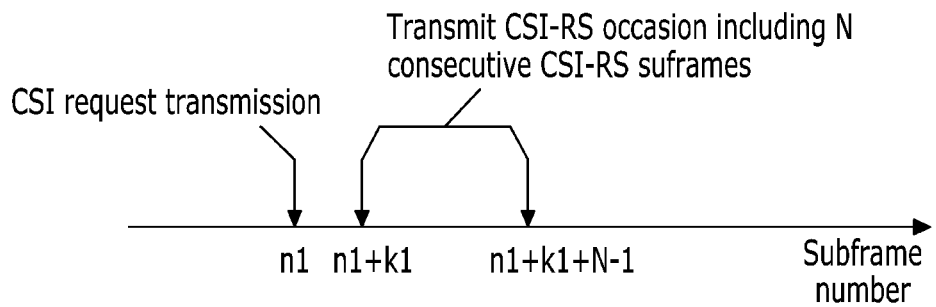
Figure 1C:
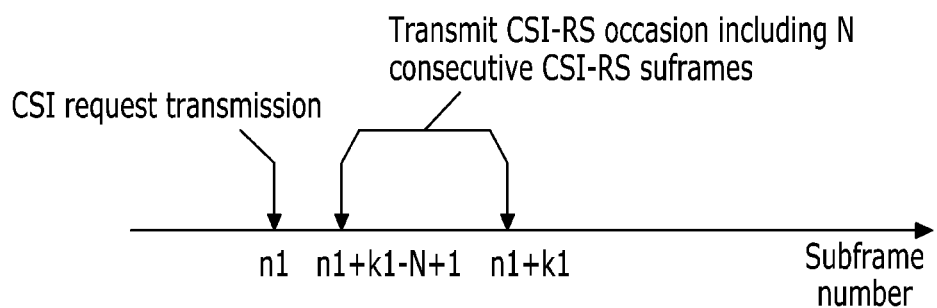

The method M221-1A will now be described with reference to FIGS. 1A, 1B, and 1C. In more detail, FIG. 1A is a diagram showing a case where CSI-RS is configured in one CSI-RS subframe. FIG. 1B is a diagram showing a case where a CSI-RS occasion is configured and the base station transmits CSI-RS in N consecutive DL subframes (including the (n1+k1)-th DL subframe) from the (n1+k1)-th DL subframe. FIG. 1C is a diagram showing a case where the CSI-RS occasion is configured and the base station transmits CSI-RS in N consecutive DL subframes (including the (n1+k1)-th DL subframe) to the (n1+k1)-th DL subframe.

In a case where the base station transmits the CSI request to the terminal in the n1-th DL subframe, the base station transmits CSI-RS in connection with the CSI request from the (n1+k1)-th DL subframe or to the (n1+k1)-th subframe. Herein, k1 is an integer of greater than or equal to 0, and may be defined in advance or may be configured through higher-layer signaling.

Meanwhile, as shown in FIG. 1A, in a case where CSI-RS is configured in one CSI-RS subframe, the base station may transmit CSI-RS in the (n1+k1)-th DL subframe. For example, as shown in FIG. 1A, in a case where the base station transmits the CSI request to the terminal in the n1-th DL subframe, the base station transmits CSI-RS in the (n1+k1)-th subframe.

Meanwhile, as shown in FIGS. 1B and 1C, in a case where a plurality of CSI-RS subframes of the above-described CSI-RS occasion are configured, in a case where transmission of a plurality of CSI-RS subframes is necessary for a plurality of CSI processes, or in a case where there is need of the base station, the base station may transmit CSI-RS in the N consecutive DL subframes from the (n1+k1)-th DL subframe (FIG. 1B) or to the (n1+k1)-th DL subframe (FIG. 10). Herein, N is an integer of greater than or equal to 1. For example, as shown in FIG. 1B, in a case where the base station transmits the CSI request to the terminal in the n1-th DL subframe, the base station transmits CSI-RS from the (n1+k1)-th subframe to the (n1+k1+N-1)-th subframe. For another example, as shown in FIG. 1C, in a case where the base station transmits the CSI request to the terminal in the n1-th DL subframe, the base station transmits CSI-RS from the (n1+k1-N+1)-th subframe to the (n1+k1)-th subframe.

The base station may signal the CSI request to the terminal through a CSI request field in a DL downlink control information (DCI) format. The terminal that has received the CSI request may receive CSI-RS in the (n1+k1)-th subframe (FIG. 1A), the N consecutive DL subframes (FIG. 1B) from the (n1+k1)-th DL subframe, or the N consecutive DL subframes (FIG. 1C) to the (n1+k1)-th DL subframe, and may measure CSI for aperiodic CSI reporting corresponding to the CSI request by using the received CSI-RS. Herein, the terminal may assume that CSI-RS in connection with the CSI request is transmitted in corresponding DL subframe(s) only in a case where there is the CSI request. If the terminal assumes that CSI-RS is transmitted in a case where there is the CSI request, a time period (or a time domain measurement window) for measurement of the corresponding CSI may be limited to a DL subframe (s) in which CSI-RS corresponding to the CSI request is transmitted. The base station may include whether to allow CSI-RS transmission in response to the CSI request in an RRC signaling parameter of CSI-RS configuration (for transmission mode 9) and/or an RRC signaling parameter of CSI process configuration, for CSI-RS transmission in connection with the CSI request. For NZP CSI-RS included in the CSI-RS configuration or the CSI process configuration, CSI-RS subframe configuration including a period and offset may be configured in order to enable periodic transmission. However, the terminal that is configured to allow CSI-RS transmission in connection with the CSI request does not regard CSI-RS as being always transmitted in a corresponding CSI-RS subframe, but regards CSI-RS as being transmitted in the (n1+k1)-th subframe (FIG. 1A), the N consecutive DL subframes (FIG. 1B) from the (n1+k1)-th DL subframe, or the N consecutive DL subframes (FIG. 1C) to the (n1+k1)-th DL subframe in case of the CSI request (for example, in the n1-th subframe), and may use this to measure a channel.

The method M221-1B is a method in which the base station transmits CSI-RS in response to the CSI-RS transmission request of the terminal. In more detail, if the base station receives the CSI-RS transmission request from the terminal in the n2-th uplink (UL) subframe, the base station transmits the CSI request to the terminal in the (n2+k2)-th DL subframe and transmits CSI-RS according to the method M221-1A. Herein, k2 is a previously defined value as an integer of greater than or equal to 0, and may be defined as one value in frequency division duplexing (FDD) and another value according to UUDL configuration in time division duplexing (TDD). The terminal may transmit CSI-RS transmission request information to the base station through a physical uplink control channel (PUCCH) or a medium access control (MAC) control element (CE). To this end, the existing PUCCH format or MAC CE format may be used or may be newly defined. The terminal may request the CSI-RS transmission including CSI-RS APG information that is required to be received from the base station. In a case where CSI-RS is configured using the above-described CSI-RS occasion, the CSI-RS APG information may include a CSI-RS APG ID of a corresponding CSI-RS APG or a CSI-RS APG ID list indicating a plurality of CSI-RS APG IDs among the CSI-RS occasion configuration information. In a case where CSI-RS is configured using the above-described plurality of CSI processes, the CSI-RS APG information may include a CSI process ID of a CSI process corresponding to a CSI-RS APG or a CSI process ID list indicating a plurality of CSI process IDs. An example relating to the CSI-RS transmission request of the terminal will now be described in a method M222.

The method M222 is a method of a combination of the method M220 and the method M221. As an example of a combination of the method M220 and the method M221-1A, the base station requests the terminal to report CSI for an update of a previously reported CSI or for a feedback of an additional CSI item while periodically transmitting CSI-RS, and transmits CSI-RS necessary for CSI measurement to the terminal. As another example of a combination of the method M220 and the method M221-1A, in a case where the base station determines that it is necessary to update CSI for the vertical domain while periodically transmitting CSI-RS corresponding to the horizontal domain for the CSI report for the horizontal domain, the base station may request the terminal to report CSI for the vertical domain and accordingly transmit CSI-RS corresponding to the vertical domain instantaneously.

For a combination of the method M220 and the method M221-1B, a method in which the terminal triggers the CSI-RS transmission request may include a method of comparing each metric value with respect to an arbitrary single or a plurality of combinations among reference signal received power (RSRP), a received signal strength indicator (RSSI), reference signal received quality (RSRQ), and a CQI and each corresponding threshold value, relatively comparing change degrees of respective values, or comparing a variation degree of each value and the threshold value. For example, in a case where the CSI-RS for the vertical domain is transmitted aperiodically and the CSI-RS for the horizontal domain is transmitted periodically, the terminal may measure CSI for the joint domain in consideration of both vertical and horizontal domains by using the CSI-RS for the horizontal domain, which is conditioned on CSI for the vertical domain obtained from the most recently received CSI-RS for the vertical domain. Hereat, in a case where a difference between the measured CQI and the previously reported CQI exceeds a predetermined level, the terminal requests the base station to transmit the CSI-RS for the vertical domain for CSI update for the vertical domain.

Meanwhile, the method M222 may include the following methods (a method M222-1A and a M222-1B) in order to prevent collision between periodic CSI-RS transmission and instantaneous CSI-RS transmission. The method M222-1A is a method in which the base station does not transmit an instantaneous CSI-RS in a CSI-RS subframe in a CSI-RS occasion of a periodic CSI-RS. The method M222-1B is a method in which the base station configures CSI-RS transmission resources of the instantaneous CSI-RS such that the CSI-RS transmission resources of the instantaneous CSI-RS are not overlapped with CSI-RS transmission resources of the periodic CSI-RS.

Meanwhile, a plurality of arbitrary methods among the above-described methods may be combined for CSI-RS transmission and configuration.

3. CSI Measurement and Report, a Method of Configuring the CSI-RS Measurement and Report, and other Related Methods A series of processes of CSI measurement and report of the terminal is as follows. The terminal receives CSI-RS according to CSI-RS configuration of the base station and estimates a channel from each CSI-RS AP from the received CSI-RS. The terminal measures CSI (including RI, PMI, or CQI) by using the estimated channel and transmits the measured CSI at a corresponding report time through PUCCH or physical uplink shared channel (PUSCH).

CSI report overhead may be greatly increased due to an increase in the number of antenna ports in CSI measurement and report for 2D antenna array, and thus an efficient CSI report method is required in consideration of an antenna array configuration, channel characteristics according to the antenna array configuration, etc. The CSI report may have different methods according to a CSI-RS transmission method.

A CSI measurement method may include the following two methods (a method M300 and a method M301) according to whether to divide a spatial domain. The method M300 is a method in which the terminal divides and measures CSI into a vertical domain CSI (hereinafter referred to as 'vCSI') and a horizontal domain CSI (hereinafter referred to as 'hCSI'). The method M301 is a method in which the terminal measures a joint domain CSI (hereinafter referred to as 'jCSI') without dividing the spatial domain.

In the method M300, vCSI may include a vertical domain PMI (hereinafter referred to as 'vPMI'), a vertical domain RI (hereinafter referred to as 'vRI'), and a vertical domain CQI ('vCQI'). vCSI may include VI, a vertical domain beam indicator (a vertical domain beam index, a vertical domain beam ID, hereinafter referred to as 'beam indicator'), or an NZP CSI-RS resource indicator corresponding to the beam indicator (or an NZP CSI-RS resource configuration ID), instead of vPMI. The terminal may obtain respective items of vCSI by using a channel estimated from vertical domain CSI-RS APs or a channel estimated from CSI-RS APs corresponding to all, some, or one column composed of CSI-RS APs arranged in the vertical domain among all CSI-RS APs.

In the RI, in a case where measurement and report is fixedly restricted (hereinafter referred to as 'rank restriction') to only one rank, vRI may be excluded from vCSI report.

In the CQI, in a case where only CQI is reported in consideration of both vCSI and hCSI, vCQI may be excluded from the vCSI report.

In the hCSI, except that the terminal uses the channel estimated from CSI-RS APs corresponding to all, some, or one row composed of CSI-RS APs arranged in the horizontal domain among all CSI-RS APs, the above cases relating to the vCSI may also be applied to the hCSI in the same manner.

The base station may receive reports of vCSI and hCSI from the terminal, respectively, and may use the vCSI and the hCSI to infer jCSI. A joint domain RI (hereinafter referred to as 'jRI') may be defined as a multiplication of vRI and hRI. A joint domain precoding matrix may be defined as a Kronecker product of a precoding matrix corresponding to vPMI and a precoding matrix corresponding to hPMI. A joint domain CQI (hereinafter referred to as 'jCQI') may be defined as a sum of vCQI and hCQI in a dB (or log) scale or may be defined as a multiplication of vCQI and hCQI in a linear scale.

hCSI may be measured on condition of vCSI in the method M300. In more detail, the terminal may measure hCSI on condition of previously measured and/or reported vCSI and report the measured hCSI. For example, in a case where the terminal receives configuration of CSI-RS for all antenna ports used by the base station for data transmission, the terminal may determine hPMI on condition of vRI* and vPMI* that are previously determined (obtained) vRI and vPMI. To this end, for given hRI and each candidate hPMI, the terminal may regard a Kronecker product of two precoding matrixes corresponding to hPMI and vPMI* as a joint precoding matrix, calculate a PMI selection metric by using the joint precoding matrix and a channel estimated from CSI-RS, and select hPMI matching an optimal condition by using the PMI selection metric.

The terminal may restrict vRI and vPMI on condition of the previously determined vRI* and vPMI*, calculate RI selection metric, and select hRI matching the optimal condition in selecting hRI. Let's call the selected hRI, hRI*. Alternatively, the terminal may obtain jRI (let's call the calculated jRI, jRI*) by using only the estimated channel, and may obtain hRI using a value found by dividing jRI* by vRI*. Let's call the obtained hRI, hRI*.

Meanwhile, vRI* may be replaced with a previously restricted value without a decision. Hereat, hCQI in hCSI may be replaced with jCQI measured in consideration of all vRI*, vPMI*, hRI*, and hPMI*, instead of hCQI measured in consideration of only hRI* and hPMI*.

Meanwhile, the terminal may measure vCSI on condition of hCSI, contrary to a method of measuring hCSI on condition of vCSI. In this case, vCSI is measured using a method of exchanging hCSI and vCSI in the above-described method. In a case where the base station configures one of the two methods (a method of measuring hCSI on condition of vCSI and a method of measuring vCSI on condition of hCSI) in the terminal, the base station may configure one of the two methods in the terminal through higher-layer signaling, and accordingly the terminal may perform CSI measurement. Alternatively, the base station may configure the terminal with a spatial domain, of which CSI for another domain is to be measured on condition, through CSI-RS configuration and/or CSI report configuration.

The vPMI and hPMI are divided into wvPMI (wideband vPMI), svPMI (subband vPMI), whPMI (wideband hPMI), and shPMI (subband hPMI) according to a measurement resource unit and may be each measured to this end. wvPMI and whPMI mean PMIs measured in consideration of CSI-RS of a full band. svPMI and shPMI mean PMIs measured in consideration of CSI-RSs of corresponding subbands divided from the full band.

Meanwhile, for the terminal to obtain the vRI, vPMI, hRI, and hPMI, the base station may configure the terminal with codebook subset restriction defined in the current standard for each domain, and the terminal configured with the codebook subset restriction obtains a measurement value excluding RI and PMI values restricted for each domain.

In the method M301, jCSI may include RI, PMI, and CQI obtained by the terminal in joint consideration of channels of antenna ports for two domains. In the current standard, the terminal performs CSI measurement and report in the form of jCSI.

The terminal measures CSI suitable for a CSI report mode configured for the above-described vCSI, hCSI, and/or jCSI in CSI reference resources. In a case where the terminal transmits the CSI report in the n3-th UL subframe, the CSI reference resources are defined to be positioned in an (n3-$n_{CQI\_ref}$)-th DL subframe in the current standard. $n_{CQI\_ref}$ for a periodic CSI report that will be described is generally defined as a value of greater than or equal to 4 or 5 and the smallest value corresponding to a valid DL subframe. $n_{CQI\_ref}$ for an aperiodic CSI report that will be described is defined to allow the CSI reference resources to be positioned in a valid DL subframe such that the terminal receives a CSI request in an UL DCI format from the base station. This may be suitable only in a case where all CSI-RS APs for CSI measurement are transmitted in one CSI-RS subframe. As described above, in a case where CSI-RS APs are divided and transmitted to a plurality of CSI-RS subframes, $n_{CQI\_ref}$ must be defined such that all corresponding CSI-RS APs may be included in the CSI reference resources. In a case where signals are transmitted from CSI-RS APs that belong to a plurality of CSI-RS APGs in different CSI-RS subframes, and different CSI-RS APGs have different periods and/or offsets, $n_{CQI\_ref}$ for each CSI-RS APG is defined as the smallest value of greater than or equal to 4 or 5 and corresponding to the valid DL subframe transmitted by each CSI-RS APG. In a case where the terminal divides and measures CSI into vCSI and hCSI, $n_{CQI\_ref}$ for each of a CSI reference resource (hereinafter referred to as 'vCSI reference resource') for measurement of vCSI and a CSI reference resource (hereinafter referred to as 'hCSI reference resource') for measurement of hCSI may be defined in consideration of CSI-RS subframes transmitted by CSI-RSs of corresponding CSI-RS APs. That is, $n_{CQI\_ref}$ for the vCSI reference resource is defined as the smallest value of greater than or equal to 4 or 5 and corresponding to CSI-RS subframes transmitted by CSI-RSs of CSI-RS APs used to measure vCSI. $n_{CQI\_ref}$ for the hCSI reference resource is defined as the smallest value of greater than or equal to 4 or 5 and corresponding to CSI-RS subframes transmitted by CSI-RSs of CSI-RS APs used to measure hCSI.

Meanwhile, a CSI report method may include the following three methods (a method M320, a method M321, and a method M322) according to periodicity or instantaneity. The method M320 is a method in which the terminal performs periodic CSI report. The method M321 is a method in which the terminal performs aperiodic CSI report. The method M322 is a method in which the terminal performs CSI report in interconnection with the periodic CSI report and the aperiodic CSI report.

In the method M320, the terminal transmits a PUCCH-based periodic CSI report to the base station. In a case where UL grant is not received, the terminal transmits the CSI report through PUCCH. In a case where the UL grant is received, the terminal transmits the CSI report through PUSCH. The base station configures the terminal with a parameter relating to a period in order to differentiate a report period for each CSI item. Meanwhile, a period is configured for each CSI item for a report on CSI divided into vCSI and hCSI, and accordingly a CSI report type may be newly defined.

In the method M321, the terminal transmits a PUSCH-based aperiodic CSI report to the base station. The terminal receives a CSI request from the base station through a CSI request field in the UL DCI format and accordingly performs measurement and report. The base station may request the terminal to report CSI on some of antenna ports by using the CSI request field. As described above in this regard, in a case where the base station configures CSI-RS using a CSI-RS occasion, the base station may include a CSI-RS APG ID of corresponding CSI-RS APG or CSI-RS APG set ID (previously configured through higher-layer signaling) indicating a plurality of CSI-RS APGs among CSI-RS occasion configuration information in the CSI request. Alternatively, in a case where the base station configures CSI-RS using multiple CSI processes, the base station may include a CSI process ID of a CSI process corresponding to a corresponding CSI-RS APG or CSI process set ID (previously configured through higher-layer signaling) corresponding to a plurality of CSI-RS APGs in the CSI request. Meanwhile, the base station may request the terminal to report CSI for a desired spatial domain by using the CSI request field. Hereat, the base station may need to transmit CSI-RS such that the terminal may measure the CSI for the corresponding spatial domain.

Figure 2:
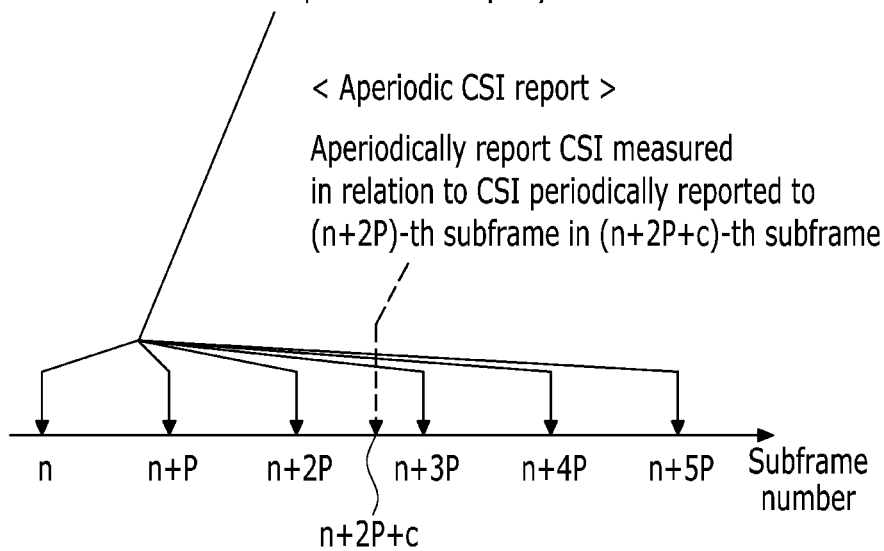
FIG. 2 is a diagram for describing a method of reporting a CSI in connection with a periodic CSI report and an aperiodic CSI report according to an exemplary embodiment of the present invention.

The method M322 is a combination of the method M320 and the method M321. The base station may configure the terminal to periodically report CSI and configure the terminal to aperiodically report CSI in connection with the configuration. The base station may inform the terminal of configuration information regarding interconnection between the periodic CSI report and the aperiodic CSI report through higher-layer signaling. The method M322 will now be described with reference to FIG. 2. FIG. 2 shows an example of the periodic CSI report having P subframes as a period and the aperiodic CSI report.

As shown in FIG. 2, the terminal configured with interconnection of the periodic CSI report and the aperiodic CSI report through higher-layer signaling may perform CSI measurement for the aperiodic CSI report having CSI measurement for the periodic CSI report as a reference (or a condition). Alternatively, conversely, the terminal may perform CSI measurement for the periodic CSI report having CSI measurement for the aperiodic CSI report as a reference (or a condition). In a case where the terminal performs the aperiodic CSI report in the (n+2P+c)-th subframe, the terminal may measure CSI having CSI reported in the (n+2P+c)-th subframe as a reference (or a condition) and periodically report the measured CSI to the base station from the (n+3P)-th subframe. Herein, the reference (or the condition) may be valid only until a next aperiodic CSI report. Alternatively, in a case where the terminal periodically reports CSI until the (n+2P)-th subframe, the terminal may measure CSI having a periodically reported CSI as a reference (or a condition) and aperiodically report the measured CSI in the (n+2P+c)-th subframe. As an example for this, the base station may configure the terminal with reporting aperiodically vCSI and configure the terminal with reporting periodically hCSI measured on condition of the corresponding vCSI.

Meanwhile, a CSI report method may include the following two methods (a method M320 and a method M321) according to the number of configured CSI processes. The method M320 is a method in which the terminal performs report configured with a single CSI process. The method M321 is a method of performing report configured with multiple CSI processes.

Both the method M320 and the method M321 are supported in the current standard. Each of the method M320 and the method M321 may be differently considered according to a PUCCH-based periodic CSI report or a PUSCH-based aperiodic CSI report.

In a case where the terminal performs the PUCCH-based periodic CSI report based on a single CSI process configuration, in order for the terminal to divide and report vCSI and hCSI, a new report period related parameter must be defined according to added CSI items, and a CSI report type must be newly defined according to a transmission combination with new CSI items.

In a case where the terminal performs the PUSCH-based aperiodic CSI report based on the single CSI process configuration, the terminal may simultaneously transmit CSI measured by using the method M300 or the method M301.

In a case where the terminal performs the PUCCH-based periodic CSI report based on multiple CSI process configuration, a method in which the terminal divides and reports vCSI and hCSI may include, as described above, a method in which CSI processes are configured for vCSI and hCSI such that the terminal measures and reports vCSI and hCSI. In this case, the terminal, as a report method for each CSI, may reuse a PUCCH-based periodic CSI report method defined in the current standard and may use a method of reducing overhead by differentially configuring a report period of vCSI and a report period of hCSI. However, as described above, it is necessary to include connection information of two CSI processes in CSI process configuration or CSI-RS configuration or to define a reference CSI process such that CSI of one CSI process is a reference for CSI measurement of another CSI process. For example, in a case where the base station allows the terminal to measure hCSI on condition of vCSI, the base station may define a vCSI-reference CSI process and inform the terminal of a corresponding CSI process ID through higher-layer signaling. The terminal may measure hCSI through a CSI process corresponding to hCSI on condition of vCSI measured (and/or reported) through the vCSI-reference CSI process. In a case where the base station defines the vCSI-reference CSI process as described above, configuration of a measurement subframe set and assumption of the terminal may need to be defined. Herein, the measurement subframe set means a set of a single or a plurality of subframe(s) in which the terminal may assume the same channel and/or interference when measuring CSI. The terminal configured with measurement subframe set through higher-layer signaling may measure CSI for each measurement subframe set.

In a case where the vCSI-reference CSI process is defined only for a single measurement subframes set, the terminal may assume that the vCSI-reference CSI process is a reference for all of a plurality of measurement subframe sets when measuring hCSI for the plurality of corresponding measurement subframe sets. That is, in a case where the vCSI-reference CSI process is configured only for the single measurement subframe set and the CSI process corresponding to hCSI is configured for the plurality of measurement subframe sets, the terminal may measure hCSI for all measurement subframe sets on condition of the vCSI of the corresponding vCSI-reference CSI process according to the assumption.

In a case where the vCSI-reference CSI process is defined for each measurement subframe set, the terminal may assume that the vCSI-reference CSI process is a reference only when measuring hCSI of the corresponding measurement subframe set. That is, in a case where the vCSI-reference CSI process is configured for the plurality of measurement subframe sets, and the CSI process corresponding to hCSI is configured for the same measurement subframe sets, the terminal may measure hCSI for each measurement subframe set on condition of vCSI of the corresponding measurement subframe set according to the assumption.

4. Codebook Configuration and a Method of Configuring the Codebook

When the base station transmits a signal to the terminal so as to form a beam or perform precoding for the corresponding signal, the base station must acquire a channel vector (or a channel matrix, hereinafter collectively referred to as 'channel matrix') between the base station and the terminal or channel state information that may replace or infer the channel matrix. To this end, if the base station transmits a reference signal (for example, NZP CSI-RS) to the terminal, the terminal estimates a channel by using the reference signal.

In order for the terminal to report an estimated channel matrix or a precoding matrix corresponding to the estimated channel matrix to the base station, the unlimited feedback size is required. In order for the terminal to report the channel matrix or a precoding matrix corresponding to the channel matrix to the base station with the unlimited feedback size, a codebook composed of a limited number of channel matrixes or precoding matrixes is defined. Each channel matrix or precoding matrix included in the codebook has a unique indicator (or an unique index). The base station and the terminal identically know the codebook in advance. The terminal searches for an indicator (which is defined as PMI) corresponding to a channel matrix (or a precoding matrix) that may have the best performance (or a selection metric) when performs beamforming (or precoding) by using the channel matrixes (or the precoding matrixes) included in the codebook for the estimated channel matrix, and reports the PMI to the base station.

The base station forms a beam or performs precoding by using the channel matrix (or the precoding matrix) corresponding to the reported PMI. Meanwhile, in a case where the number of transmission antenna ports is great, a larger number of feedback size may be required to follow a channel capacity increase according to the great number of transmission antenna ports.

Meanwhile, the codebook may be configured as a double structure to reduce a PMI feedback size. The terminal may divide PMI into a first PMI and a second PMI to report one channel matrix (or one precoding matrix) that belongs to the codebook. The first PMI may be defined to have a longer period than the second PMI or to be less frequently reported than the second PMI. The first PMI may indicate a set composed of a plurality of channel matrixes (or precoding matrixes). The second PMI may be defined to include information used to select a single or a plurality of channel matrix(es) (or precoding matrix(es)) in the set composed of the plurality of channel matrixes (or precoding matrixes) indicated by the first PMI and/or information used to combine all or a selected plurality of channel matrixes (or precoding matrixes).

In a case where a transmission antenna array is configured as pairs of orthogonal antennas having dual polarization (i.e. cross polarization antennas are used), the second PMI may be defined to include information for co-phasing different polarization. The plurality of channel matrixes (or precoding matrixes) indicated by the first PMI may be configured such that beams corresponding to respective columns of the matrixes are adjacent to each other or are not adjacent to each other but are spaced apart from each other by a predetermined space. The former may be suitable to use in a system having good antenna calibration. The latter may be used even in a system not having good antenna calibration.

Therefore, for performance increase, the plurality of channel matrixes indicated by the first PMI may be differently configured according to an antenna calibration degree of the base station. To this end, the codebook having the double structure (hereinafter collectively referred to as "double codebook") is defined to configure a plurality of first PMIs, and the base station informs the terminal of configuration information (or an indicator designating the configuration information) of the first PMI that is to be used through higher-layer signaling (or system information block (SIB) signaling, or RRC signaling). The terminal performs the PMI selection and report based on the configuration information of the configured first PMI. A configuration of the first PMI is referred to as a first PMI configuration below. Herein, defining of the codebook having a plurality of first PMI configurations is not limited to a purpose of being adapted to antenna calibration performance and may be used for other purposes. As an example of a method of adaptively configuring the first PMI configuration to the antenna calibration performance, in a case where configuring of 4 adjacent beams and configuring of 4 beams rotated by 90 degrees are defined to include the first PMI configuration of the double codebook, the base station in which the antenna calibration is satisfied to some level may configure the first PMI configuration configured as the adjacent 4 beams in the terminal, and the base station in which the antenna calibration is not satisfied to some level may configure the first PMI configuration configured as the 4 beams rotated by 90 degrees in the terminal.

Meanwhile, to reduce interference due to use of a specific PMI or restrict a specific rank selection, a subset of the codebook may be restricted. Herein, restricting of the subset of the codebook means restricting of a part of the channel matrixes (or precoding matrixes) included in the codebook such that the terminal does not select the part and/or does not report the part. For example, in a case where the size of the codebook is 16 (for example, it is assumed that an indicator range included in the codebook is 0~15) and the subset of the codebook is not restricted, the terminal may select and report a PMI in the indicator range of 0~15. For another example, in a case where the subset of the codebook is restricted such that indicators 0~7 are not selected, the terminal may select and report a PMI in the indicator range of 8~15. In an existing method of restricting the subset of the codebook, the base station defines whether to restrict selection of each indicator included in the codebook as a bitmap (for example, it is defined to restrict bit 0 and to permit bit 1, or, conversely, it is defined to restrict bit 1 and to permit bit 0), and configures such a definition in the terminal through higher-layer signaling. Even if the subset of the codebook is restricted, the terminal may report the PMI with the same feedback size.

Meanwhile, to quickly perform signaling on a codebook subset restriction, physical layer signaling like DCI may be used. Physical layer signaling has limited signaling resources, and thus it may be impossible or inefficient to perform signaling whether to restrict selection of each indicator included in the codebook through the bitmap. In addition, a method of configuring the codebook subset restriction using higher-layer signaling (or SIB signaling or RRC signaling) needs a reduction in signaling overhead for the codebook subset restriction of a codebook having a large size.

A method of resolving this is a method (hereinafter collectively referred to as 'first signaling overhead reduction method') of grouping a plurality of indicators (or PMIs) and configuring whether to restrict selection as the bitmap in a group unit. For example, in a case where the size of the codebook is 16, if indicators 0~3 constitute group 0, indicators 4~7 constitute group 1, indicators 8~11 constitute group 2, and indicators 12~15 constitute group 3, the codebook subset restriction is composed of a 4 bit bitmap.

As an example in this regard, in a case where the base station configures codebook subset restriction information '0110' (for example, it is defined to restrict by bit 0 and to permit by bit 1), the terminal's interpretation is that selection of indicators that belong to the groups 0 and 3 is restricted.

Another method of reducing the signaling size for the codebook subset restriction is a method (hereinafter referred to as 'second signaling overhead reduction method') of using a structure of a double codebook. The bitmap for the codebook subset restriction may be composed in a unit of the first PMI. Selection of all channel matrixes (or precoding matrixes) (or pairs of first PMIs and second PMIs corresponding to the channel matrixes) indicated by a restricted first PMI may be restricted. For example, in a case where the size of the double codebook is composed of 8 bits, the first PMI is composed of 4 bits, and the second PMI is composed of 4 bits, the size of the existing codebook subset restriction method is composed of 256 bits, whereas, if the codebook subset restriction is performed in the unit of the first PMI, the size of the bitmap is composed of 16 bits.

Another method of reducing the signaling size for the codebook subset restriction is a method (hereinafter referred to as 'third signaling overhead reduction method') of restricting the double codebook by grouping the first PMIs into a plurality of groups. The third signaling overhead reduction method is a method of combining the above-described first and second signaling overhead reduction methods. In this case, selection of all channel matrixes (or precoding matrixes) (or the pairs of the first PMIs and the second PMIs corresponding to the channel matrixes) indicated by all first PMIs that belong to restricted groups is restricted.

A method of expressing the codebook subset restriction may be a method of grouping a plurality of indicators and designating group indicators that are to be restricted, in addition to a method of expressing the codebook subset restriction as the bitmap. Selection of all indicators that belong to the indicated group indicators is restricted.

In the above-described bitmap expression based codebook subset restriction, the bitmap may be configured to include all restrictions for each rank or may be commonly configured for all ranks. To use the latter case, the first PMIs may be defined for all ranks in the same manner.

Meanwhile, the restriction may be replaced with permission in the above-described all codebook subset restriction methods. In this case, all is the same as described above except that the meaning of the restriction is interpreted as the permission.

Meanwhile, according to the existing method, although the codebook subset is restricted, the terminal may report PMIs with the same feedback size to the base station. To reduce the feedback size, the terminal may sequentially provide new indicators to indicators excluding restricted indicators and perform PMI report on the new indicators. In more detail, the terminal may count the indicators excluding the restricted indicators from 0 to 'the number of non-restricted indicators subtracted by 1' in order of original indicators again. For example, in a case where indicators 0, 1, 5, 10, 12, 13, 14, and 15 are restricted in a codebook having indicators 0~15, the terminal newly counts the non-restricted indicators as shown in Table 1 below.

TABLE 1

Example of a codebook indicator change according to the codebook restriction

| | Original indicators | | | | | | | |
|---|---|---|---|---|---|---|---|---|
| | 2 | 3 | 4 | 6 | 7 | 8 | 9 | 11 |
| New indicators according to codebook restriction | 0 | 1 | 2 | 3 | 4 | 5 | 6 | 7 |

The terminal reports the newly counted indicators to the base station for the indicator excluding the restricted indicators. Hereat, size of a PMI has 3 bits that is the size of the restricted codebook, other than 4 bits. The base station is a host that configures the codebook subset restriction, and thus the base station knows that the PMI is reported as 3 bits according to the codebook subset restriction and may interpret the non-restricted indicators as shown in Table 1 based on the reported PMI. For example, if the terminal reports PMI 3 to the base station, the base station converts the reported PMI 3 into the original indicator 6 and obtains a channel matrix (or a precoding matrix) corresponding to the indicator 6.

5. CSI Process Configuration Method

A beam shape of a signal transmitted through an antenna port may be different according to the above-described TXRU virtualization and antenna port virtualization. The beam shape may be characterized as beam width and beam direction. Therefore, the width and direction of a CSI-RS AP beam may be different according to the two virtualization methods in CSI-RS AP transmission. Hereinafter, transmitting of a signal of a CSI-RS AP such that a beam width is large by as much as cell coverage and different CSI-RS APs have the same beam width and beam direction is defined as a first CSI-RS mode. Transmitting of a CSI-RS AP signal such that a beam width is smaller than cell coverage and different combinations of CSI-RS AP and CSI-RS resource have different beam directions is defined as a second CSI-RS mode.

Unlike the first CSI-RS mode, in the second CSI-RS mode, when the terminal measures CSI, the terminal selects all or some of beams applied to CSI-RS APs, measures CSI (for example, an arbitrary combination of CQI, PMI, and RI) for the selected beams, and reports the measured CSI. Therefore, the first CSI-RS mode and the second CSI-RS mode may be categorized with respect to a beam shape of a CSI-RS AP signal or may be categorized with respect to whether to include a feature of selecting a single beam or a plurality of beams when measuring and reporting CSI and reporting information relating to the selection.

The terms of the first CSI-RS mode and the second CSI-RS mode may be respectively replaced with a CSI reporting class A and a CSI reporting class B. The terms of the first CSI-RS mode and the second CSI-RS mode are used below unless particularly mentioned. The base station may operate the first CSI-RS mode, the second CSI-RS mode, and a combination of the first CSI-RS mode and the second CSI-RS mode. The base station may also operate different modes for each terminal.

5.1. The First CSI-RS Mode

The existing one CSI process is associated with one CSI-RS resource (or NZP CSI-RS resource) and a one CSI-IM resource. CSI reported by the terminal corresponds to a CSI process configured through higher-layer signaling. The existing NZP CSI-RS resource may configure 1, 2, 4, or 8 CSI-RS APs.

Meanwhile, the first CSI-RS mode requires support of NZP CSI-RS having the number of antenna ports exceeding 8 such as 12 or 16. A method of configuring NZP CSI-RS having the number of antenna ports exceeding 8 may include a method of configuring a plurality of NZP CSI-RS resources having a 3GPP LTE Release 12 definition or a new definition. For example, NZP CSI-RS having 12 antenna ports may be configured as a combination of NZP CSI-RS resource having 8 antenna ports and NZP CSI-RS resource having 4 antenna ports or a combination of 3 NZP CSI-RS resources having 4 antenna ports. In a case where all NZP CSI-RS resources are restricted to have the same number of antenna ports, the latter configuration may be used.

To configure a plurality of NZP CSI-RS resources, one CSI process may be associated with the plurality of NZP CSI-RS resources and one CSI-IM resource, unlike the exiting one CSI process. In more detail, the base station may include an ID list indicating a plurality of NZP CSI-RS resource configurations and an ID (CSI-IM resource configuration ID) indicating CSI-IM resource configuration in one CSI process configuration such that the CSI process configuration may include the plurality of NZP CSI-RS resource configurations and the CSI-IM resource configuration. That is, the base station includes the NZP CSI-RS resource configuration ID list in the CSI process configuration, instead of the existing NZP CSI-RS resource configuration ID. The NZP CSI-RS resource configuration ID list includes a single or a plurality of NZP CSI-RS resource configuration ID(s). The terminal configured with the CSI process configuration through higher-layer signaling measures a channel using CSI-RS of CSI-RS APs included in the NZP CSI-RS resources corresponding to the NZP CSI-RS resource configuration ID list, measures interference from resources defined for CSI-RS APs included in the CSI-IM resource corresponding to the CSI-IM resource configuration ID, measures CSI from the channel and interference, and reports the measured CSI to the base station. To this end, the terminal may count port numbers for the CSI-RS APs defined in the plurality of NZP CSI-RS resources by using the following two methods (a method M410 and a method M420).

The method M410 is a method in which the terminal counts CSI-RS AP numbers in an order of input to the NZP CSI-RS resource configuration ID list (hereinafter referred to as 'first list'). For example, in a case where ID values included in the NZP CSI-RS resource configuration ID list indicating two NZP CSI-RS resource configurations are configured as 1 and 0, NZP CSI-RS resource corresponding to NZP CSI-RS resource configuration ID 1 given first in the first list has 8 ports, and NZP CSI-RS resource corresponding to NZP CSI-RS resource configuration ID 0 given next in the first list has 4 ports, the terminal provides port numbers 15~22 to the 8 ports corresponding to the NZP CSI-RS resource configuration ID 1, and provides port numbers 23~26 to the 4 ports corresponding to the NZP CSI-RS resource configuration ID 0 following the previous port numbers.

The method M420 is a method in which the terminal counts CSI-RS AP numbers in an ascending (or descending) order of the NZP CSI-RS resource configuration IDs of the first list. For example, on the assumption that the terminal counts the CSI-RS AP numbers in an ascending order of the NZP CSI-RS resource configuration IDs, in a case where ID values included in the NZP CSI-RS resource configuration ID list indicating two NZP CSI-RS resource configurations are configured as 1 and 0, NZP CSI-RS resource corresponding to NZP CSI-RS resource configuration ID 0 has 4 ports, and NZP CSI-RS resource corresponding to NZP CSI-RS resource configuration ID 1 has 8 ports, the terminal provides port numbers 15~18 to the 4 ports corresponding to NZP CSI-RS resource configuration ID 0, and provides port numbers 19~26 to the 8 ports corresponding to NZP CSI-RS resource configuration ID 1 following the previous port numbers.

5.2. The Second CSI-RS Mode

Meanwhile, in the second CSI-RS mode, beams may be formed and transmitted in different directions for an NZP CSI-RS AP or NZP CSI-RS resource, or a combination thereof. Hereinafter, a resource unit including a single or a plurality of NZP CSI-RS AP(s) to which the same beam is applied is collectively referred to as a BF CSI-RS Resource.

5.2.1. CSI-RS Configuration Method for the Second CSI-RS Mode

In the CSI-RS configuration method for the second CSI-RS mode, for CSI measurement for a single or a plurality of beam(s), the terminal is configured with a single or a plurality of NZP CSI-RS resource(s) in one CSI process through higher-layer signaling. In this case, the terminal may assume that beamforming for CSI-RSs of all CSI-RS APs in the same NZP CSI-RS resource is applied with the same direction. The terminal may also assume that different beamforming is applied between CSI-RSs transmitted in different NZP CSI-RS resources. Therefore, one NZP CSI-RS resource corresponds to one BF CSI-RS resource. To this end, the base station may include the NZP CSI-RS resource configuration ID list in the CSI process configuration such that a plurality of NZP CSI-RS resource configurations are included in the CSI process configuration. Herein, the same number of NZP CSI-RS APs that belong to different NZP CSI-RS resources may be configured. The terminal may not expect that different NZP CSI-RS resources configured in one CSI process have different numbers of NZP CSI-RS APs.

In a case where NZP CSI-RS resources have different numbers of NZP CSI-RS APs, since CSI reporting/feedback payload size is different according to a beam (or NZP CSI-RS resource) selected when reporting CSI, it may be difficult for the terminal and the base station to assume the same CSI reporting/feedback payload size.

Additionally, the terminal may be commonly configured with one CSI-IM resource for all configured NZP CSI-RS resources or may be configured with different CSI-IM resources for each of all the configured NZP CSI-RS resources in one CSI process configured through higher-layer signaling. The former case has a feature that one CSI process may be defined to have at least one NZP CSI-RS resource and one CSI-IM resource associated with each other, and the terminal may measure CSI by reflecting the same intra-cell interference. The latter case has a feature that one CSI process may be defined to have at least one NZP CSI-RS resource and at least one CSI-IM resource associated with each other, and the terminal may measure CSI by reflecting different intra-cell interference and/or different inter-cell interference for each pair of NZP CSI-RS resource and CSI-IM resource corresponding to each beam. In a case where one CSI-IM resource is configured in a CSI process, the terminal follows the former. In a case where CSI-IM is configured such that the number of CSI-IM resources is the same as the number of NZP CSI-RS resources, the terminal follows the latter.

It may not be expected that the terminal is configured with different number of CSI-IM resources from the number of NZP CSI-RS resources. To configure a plurality of CSI-IM resources, a plurality of CSI-IM resource configuration ID lists may be included in the CSI process configuration. An NZP CSI-RS resource and a CSI-IM resource that belong to their respective list in the same order form a pair. The terminal measures a channel using CSI-RSs of CSI-RS APs that belong to the NZP CSI-RS resource in the corresponding pair, measures interference in resources defined for CSI-RS APs that belong to the CSI-IM resource in the corresponding pair, and obtains CSI from these (the measured channel and the measured interference). The terminal measures channels for the CSI-RS APs of the NZP CSI-RS resource corresponding to each beam as described above, measures interference from the common CSI-IM resource (or the CSI-IM resource corresponding to the corresponding beam (or the corresponding NZP CSI-RS resource)), selects a single or a plurality of beam(s), measures CSI for the selected beam(s), and reports the measured CSI. Herein, the terminal may include NZP CSI-RS resource configuration ID(s) itself(themselves) corresponding to the selected beam (s) in the CSI report or a bitmap as which the NZP CSI-RS resource configuration ID(s) is expressed. In a case where the terminal selects a single beam, the former may be preferable. In a case where the terminal selects a plurality of beams, the latter may be preferable. The size of the bitmap may be defined as the maximum number of NZP CSI-RS resources that can be configured (included) in one CSI process or the number of NZP CSI-RS resources configured in one CSI process. It may be defined that the first bit from the left (or right) of the bitmap corresponds to the lowest (or highest) NZP CSI-RS resource configuration ID, the next second bit corresponds to the second lowest (or highest) NZP CSI-RS resource configuration ID, and other bits correspond to an ascending (or descending) order of the NZP CSI-RS resource configuration IDs. It may be defined that a bit having a value of 0 in the bitmap means that an NZP CSI-RS resource (or a beam corresponding to the NZP CSI-RS resource) is not selected, and a bit having a value of 1 means that an NZP CSI-RS resource is selected (or a beam corresponding to the NZP CSI-RS resource), or vice versa.

It is defined that in a case where a large-scale property of a channel over which a symbol on one antenna port is transmitted can be inferred from a channel over which a symbol on the other antenna port is transmitted, two corresponding antenna ports are quasi co-located. Herein, the large-scale channel property may include one or a plurality of combinations of Doppler shift, Doppler spread, average delay, delay spread, and average gain.

The terminal configured with transmission mode 8-10 for a serving cell may assume that DM-RS APs 7-14 of the serving cell satisfy QCL (quasi co-location) with respect to the Doppler shift, the Doppler spread, the average delay, the delay spread, and the average gain in a given subframe. The terminal may assume QCL with respect to the delay spread, the Doppler spread, the Doppler shift, the average gain, and the average delay between CSI-RS APs that belong to a CSI-RS resource configuration.

The terminal configured with transmission mode 1-9 for a serving cell may assume that CRS APs 0-3, DM-RS AP 5, DM-RS APs 7-14, and CSI-RS APs 15-22 satisfy QCL with respect to the Doppler shift, the Doppler spread, the average delay, and the delay spread.

The terminal configured with transmission mode 10 for a serving cell defines the following two types of QCL (QCL Type A, QCL Type B) by qcl-Operation that is a higher-layer parameter in decoding PDSCH demodulated using DM-RS.

For the QCL Type A, the terminal may assume QCL with respect to the Doppler shift, the Doppler spread, the average delay, and the delay spread between CRS APs 0-3, DM-RS APs 7-14, and CSI-RS APs 15-22. To support the number of antenna ports extended for the first CSI-RS mode, the CSI-RS APs 15-22 may be replaced with CSI-RS APs 15-(K+14). Herein, K denotes the maximum number of CSI-RS APs that can be configured for a CSI process.

For the QCL Type B, the terminal may assume QCL with respect to the Doppler shift, the Doppler spread, the average delay, and the delay spread between CSI-RS APs 15-22 corresponding to the CSI-RS resource configuration identified by qcl-CSI-RS-ConfigNZPId-r11 that is a higher-layer parameter and DM-RS APs 7-14 in a resource in which PDSCH scheduled (allocated) by a DL DCI format including a 'PDSCH RE Mapping and Quasi-Co-Location Indicator' field corresponding to the qcl-CSI-RS-ConfigNZPId-r11 is transmitted. To support the number of antenna ports extended for the first CSI-RS mode, the CSI-RS APs 15-22 may be replaced with the CSI-RS APs 15-(K+14). Herein, K denotes the maximum number of CSI-RS APs that can be configured for a CSI process.

The terminal configured with transmission mode 10 and QCL Type B may assume QCL with respect to the Doppler shift and the Doppler spread between CRS APs 0-3 corresponding to qcl-CRS-Info-r11 of a CSI-RS resource configuration and CSI-RS APs 15-22 of the CSI-RS resource configuration. To support the number of antenna ports extended for the first CSI-RS mode, the CSI-RS APs 15-22 may be replaced with the CSI-RS APs 15-(K+14). Herein, K denotes the maximum number of CSI-RS APs that can be configured for a CSI process.

As described above, in a case where BF CSI-RS resources are distinguished for each NZP CSI-RS resource in the second CSI-RS mode, the terminal may not assume QCL with respect to all large-scale channel properties between CSI-RS APs that belong to different NZP CSI-RS resources, may assume QCL only with respect to the Doppler shift and the Doppler spread, may assume QCL only with respect to the Doppler shift, the Doppler spread, the average delay, and the delay spread, or may assume QCL with respect to the Doppler shift, the Doppler spread, the average delay, the delay spread, and the average gain. Among such four QCL assumptions, one QCL assumption that the terminal may follow may be defined in advance. Alternatively, the base station may configure the terminal with a QCL assumption (as an example, one of the four assumptions mentioned above may be configured) regarding the large-scale channel properties between the CSI-RS APs that belong to different NZP CSI-RS resources through higher-layer signaling, and the terminal may follow the corresponding assumption configured through higher-layer signaling.

The terminal configured with transmission mode 1-9 or with transmission mode 10 along with the QCL Type A may need to change QCL assumption between DM-RS antenna ports (excluding DM-RS AP 5 in transmission mode 10) and CSI-RS antenna ports. The terminal may assume that QCL with respect to the Doppler shift, the Doppler spread, the average delay, and the delay spread is satisfied between DM-RS antenna ports and CSI-RS antenna ports of NZP CSI-RS resource(s) indicated by 'NZP CSI-RS resource indicator(s) (or NZP CSI-RS resource configuration ID(s)) corresponding to selected beam(s)' that are most recently reported (or most recently reported before the subframe k3 subframes previous to the current subframe). Herein, k3≥K3, and K3 may be configured as a value of greater than or equal to 0 in consideration of a period between a report time of corresponding information and a receiving time of DL allocation information using the report time of the corresponding information. Whether the assumption is valid may be defined in advance or may be configured to the terminal by the base station through higher-layer signaling, which may be followed by the terminal.

The terminal may not assume QCL with respect to all large-scale channel properties between the DM-RS antenna ports and CSI-RS antenna ports of NZP CSI-RS resource(s) that are not indicated by the 'NZP CSI-RS resource indicator (s) (or NZP CSI-RS resource configuration ID(s))corresponding to selected beam(s)' that are most recently reported (or most recently reported before the subframe k3 subframes previous to the current subframe), may assume QCL only with respect to the Doppler shift and the Doppler spread, or assume QCL only with respect to the Doppler shift, the Doppler spread, the average delay, and the delay spread. Herein, k3≥K3, and K3 may be configured as a value of greater than or equal to 0 in consideration of the period between the report time of corresponding information and the receiving time of the DL allocation information using the report time of the corresponding information. Among such three QCL assumptions (or some of the three QCL assumptions as candidates), one QCL assumption that the terminal may follow may be defined in advance, and the base station may configure the terminal with one of such three QCL assumptions (or some of the three QCL assumptions as candidates) through higher-layer signaling. In this case, the terminal may follow the configured QCL assumption.

The terminal configured with transmission mode 10 along with QCL Type B may assume QCL with respect to the Doppler shift, the Doppler spread, the average delay, and the delay spread between the CSI-RS APs 15-22 corresponding to the CSI-RS resource configuration identified by qcl-CSI-RS-ConfigNZPId-r11 that is the higher-layer parameter and the DM-RS APs 7-14 in a resource in which PDSCH scheduled (allocated) by the DL DCI format including the 'PDSCH RE Mapping and Quasi-Co-Location Indicator' field corresponding to the qcl-CSI-RS-ConfigNZPId-r11 is transmitted. In this case, a method of supporting a case where the maximum number of NZP CSI-RS resource configurations that may be configured exceeds 3 (that is an existing limit value) is necessary.

A first supporting method is a method of extending a 'PDSCH RE Mapping and Quasi-Co-Location Indicator' field size and a range of PDSCH-RE-MappingQCL-ConfigId to the maximum number of NZP CSI-RS resource configurations that can be configured.

A second supporting method is a method of maintaining the 'PDSCH RE Mapping and Quasi-Co-Location Indicator' field size (an existing size is 2 bits) and the range (an existing range is 1~4) of PDSCH-RE-MappingQCL-ConfigId, and instead of qcl-CSI-RS-ConfigNZPId-r11 of a PDSCH-RE-MappingQCL-Config parameter, including a CSI process ID to which NZP CSI-RS resource corresponding to qcl-CSI-RS-ConfigNZPId-r11 belongs.

In this case, the terminal may not assume QCL with respect to all large-scale channel properties between the CSI-RS APs 15-22 corresponding to CSI-RS resource configuration(s) identified by CSI process ID instead of qcl-CSI-RS-ConfigNZPId-r11 that is the higher-layer parameter and the DM-RS APs 7-14 in a resource in which PDSCH scheduled (allocated) by the DL DCI format including the 'PDSCH RE Mapping and Quasi-Co-Location Indicator' field corresponding to the qcl-CSI-RS-ConfigNZPId-r11 is transmitted, may assume QCL with respect to the Doppler shift and the Doppler spread, or may assume QCL with respect to the Doppler shift, the Doppler spread, the average delay, and the delay spread. Among such three QCL assumptions, one QCL assumption that the terminal may follow may be defined in advance, and the base station may configure the terminal with one of such three QCL assumptions (or some of the three QCL assumptions as candidates) through higher-layer signaling. In this case, the terminal may follow the configured QCL assumption.

Alternatively, the terminal may not assume QCL with respect to all large-scale channel properties between the CSI-RS APs 15-22 corresponding to the CSI-RS resource configuration(s) identified by the CSI process ID instead of qcl-CSI-RS-ConfigNZPId-r11 that is the higher-layer parameter and the DM-RS APs 7-14 in a resource in which PDSCH scheduled (allocated) by the DL DCI format including the 'PDSCH RE Mapping and Quasi-Co-Location Indicator' field corresponding to a CSI process ID instead of the corresponding qcl-CSI-RS-ConfigNZPId-r11 is transmitted, may assume QCL with respect to the Doppler shift and the Doppler spread, or may assume QCL with respect to the Doppler shift, the Doppler spread, the average delay, and the delay spread. Among such three QCL assumptions, one QCL assumption that the terminal may follow may be defined in advance, and the base station may configure the terminal with one of such three QCL assumptions (or some of the three QCL assumptions as candidates) through higher-layer signaling. In this case, the terminal may follow the configured QCL assumption.

Alternatively, the terminal may not assume QCL with respect to all large-scale channel properties between the CSI-RS APs 15-22 that are CSI-RS antenna ports of NZP CSI-RS resource(s) indicated by 'NZP CSI-RS resource indicator(s) (or NZP CSI-RS resource configuration ID(s)) corresponding to selected beam(s)' that are most recently reported (or most recently reported before the subframe k3 subframes previous to the current subframe) for a CSI process identified by the CSI process ID instead of qcl-CSI-RS-ConfigNZPId-r11 that is the higher-layer parameter and the DM-RS APs 7-14 in a resource in which PDSCH scheduled (allocated) by the DL DCI format including the 'PDSCH RE Mapping and Quasi-Co-Location Indicator' field corresponding to the corresponding CSI process ID is transmitted, may assume QCL with respect to the Doppler shift and the Doppler spread, or may assume QCL with respect to the Doppler shift, the Doppler spread, the average delay, and the delay spread. Herein, k3≥k3, and K3 may be configured as a value of greater than or equal to 0 in consideration of a period between a report time of corresponding information and a receiving time of DL allocation information using the report time of the corresponding information. Among such three QCL assumptions, one QCL assumption that the terminal may follow may be defined in advance, and the base station may configure the terminal with one of such three QCL assumptions (or some of the three QCL assumptions as candidates) through higher-layer signaling. In this case, the terminal may follow the configured QCL assumption.

Alternatively, the base station may group NZP CSI resource(s) in which QCL between CSI-RS antenna ports to which at least one NZP CSI resource(s) belong may be assumed, provide IDs (NZP CSI resource group IDs or NZP CSI resource configuration IDs; may have a range of 1~4) to corresponding groups, and inform the terminal of the IDs through higher-layer signaling. This method is a method of using NZP CSI resource group IDs instead of the CSI process ID in the above-described method of using the CSI process ID.

Alternatively, the terminal may not assume QCL with respect to all large-scale channel properties between CRS APs 0-3 corresponding to a qcl-CRS-Info-r11 parameter included in the CSI-RS resource configuration(s) identified by qcl-CSI-RS-ConfigNZPId-r11 that is the higher-layer parameter and the DM-RS APs 7-14 in a resource in which PDSCH scheduled (allocated) by the DL DCI format including the 'PDSCH RE Mapping and Quasi-Co-Location Indicator' field corresponding to the corresponding qcl-CSI-RS-ConfigNZPId-r11 is transmitted, may assume QCL with respect to the Doppler shift and the Doppler spread, or may assume QCL with respect to the Doppler shift, the Doppler spread, the average delay, and the delay spread. Among such three QCL assumptions, one QCL assumption that the terminal may follow may be defined in advance, and the base station may configure the terminal with one of such three QCL assumptions (or some of the three QCL assumptions as candidates) through higher-layer signaling. In this case, the terminal may follow the configured QCL assumption.

In a case where the CSI process configured through higher-layer signaling includes a plurality of NZP CSI-RS resources corresponding to respective beams, the terminal may obtain PMI and RI for each NZP CSI-RS resource or at least one selected NZP CSI-RS resource(s) or may obtain common PMI and RI for all NZP CSI-RS resources or at least one selected NZP CSI-RS resource(s). The terminal may obtain CQI using PMI(s) and RI(s) obtained for all NZP CSI-RS resource(s) or selected NZP CSI-RS resource(s). Herein, PMI and CQI are values obtained for wideband or subband. The terminal reports the above-obtained CQI, PMI, and RI to the base station.

5.2.2. Another CSI-RS Configuration Method for the Second CSI-RS Mode

Another CSI-RS configuration method for the second CSI-RS mode, the terminal is configured with a single or a plurality of NZP CSI-RS resources in one CSI process through higher-layer signaling, and herein, one NZP CSI-RS resource includes a plurality of BF CSI-RS resources. That is, one NZP CSI-RS resource may include a plurality of CSI-RS APs to which different beams are applied. Herein, a set of NZP CSI-RS AP(s) to which the same beam is applied is defined as an NZP CSI-RS AP group. To this end, CSI process configuration may include a plurality of NZP CSI-RS resource configuration ID lists. Additional information is necessary for configuring a plurality of NZP CSI-RS AP groups in one NZP CSI-RS resource. The corresponding additional information may include the number of NZP CSI-RS APs in an NZP CSI-RS AP group or may include the number of NZP CSI-RS AP groups. As described above, to remove ambiguity in CSI reporting/feedback payload size between the base station and the terminal, the number of NZP CSI-RS APs belonging to different BF CSI-RS resources (or NZP CSI-RS AP groups) may be configured to be the same. The total number of NZP CSI-RS APs for NZP CSI-RS resources may be configured to be a multiple (or the number of NZP CSI-RS APs of each NZP CSI-RS resource is a multiple of the number of NZP CSI-RS APs belonging to a BF CSI-RS resource) of the number of NZP CSI-RS APs that belong to one BF CSI-RS resource or only a configuration parameter satisfying such a condition may be defined. Different IDs are provided to all NZP CSI-RS AP groups over all NZP CSI-RS resources configured in one CSI process. Additionally, the terminal may be commonly configured with one CSI-IM resource for all configured NZP CSI-RS resources or may be configured with different CSI-IM resources for all configured NZP CSI-RS resources in a CSI process configured through higher-layer signaling. The former case has a feature that the terminal may measure CSI by reflecting the same intra-cell interference. The latter case has a feature that the terminal may measure CSI by reflecting different intra-cell interference and/or different inter-cell interference. In a case where one CSI-IM resource is configured in a CSI process, the terminal follows the former case. In a case where CSI-IM is configured such that the number of CSI-IM resources is the same as the number of NZP CSI-RS resources, the terminal follows the latter case. It may not be expected that the terminal is configured with different number CSI-IM resources from the number of NZP CSI-RS resources. To configure a plurality of CSI-IM resources, CSI process configuration may include a plurality of CSI-IM resource configuration ID lists. An NZP CSI-RS resource and a CSI-IM resource that belong to their respective lists in the same order form a pair. The terminal measures a channel using CSI-RSs of CSI-RS APs that belong to the NZP CSI-RS resource in the corresponding pair, measures interference in resources defined for CSI-RS APs that belong to the CSI-IM resource in the corresponding pair, and obtains CSI from the measured channel and interference.

As described above, in a case where BF CSI-RS resources are distinguished for each CSI-RS AP group, the terminal may need to change QCL assumptions between antenna ports. Although the existing terminal may assume QCL with respect to the delay spread, the Doppler spread, the Doppler shift, the average gain, and the average delay between all CSI-RS APs included in the same CSI-RS resource configuration, in a case where CSI-RS APs in a CSI-RS resource configuration are transmitted in different beams, the existing QCL assumptions may not be preferable. Therefore, although CSI-RS APs belong to the same NZP CSI-RS resource, the terminal may assume QCL with respect to the delay spread, the Doppler spread, the Doppler shift, the average gain, and the average delay between CSI-RS APs that belong to the same CSI-RS AP group.

Additionally, when PDSCH is transmitted in transmission mode 10, since it is impossible to indicate the NZP CSI-RS AP group by using qcl-CSI-RS-ConfigNZPId-r11 in the 'PDSCH RE Mapping and Quasi-Co-Location Indicator' field included in the corresponding DL DCI format, qcl-CSI-RS-ConfigNZPId-r11 needs to be replaced with NZP CSI-RS AP group ID corresponding to a beam over which the corresponding PDSCH is transmitted. In a case where the number of beams (or the number of NZP CSI-RS AP groups) is greater than the existing size of qcl-CSI-RS-ConfigNZPId-r11 that can be configured, a field size may be increased. The maximum number of NZP CSI-RS AP groups is defined, and each CSI process configures the number of NZP CSI-RS AP groups which is smaller than or the same as the maximum number of NZP CSI-RS AP groups. Since the base station and the terminal know the maximum number of NZP CSI-RS AP groups, the size of the 'PDSCH RE Mapping and Quasi-Co-Location Indicator' field is configured in accordance with the maximum number of NZP CSI-RS AP groups, and the base station and the terminal transmit and receive DCI including the corresponding field, respectively.

In a case where the CSI process configured through higher-layer signaling includes a plurality of NZP CSI-RS AP groups corresponding to each beam, the terminal may obtain PMI and RI for each NZP CSI-RS AP group or for each of at least one selected NZP CSI-RS AP group(s), or may obtain common PMI and RI for all NZP CSI-RS AP groups or at least one selected NZP CSI-RS AP group(s). The terminal may obtain CQI using PMI(s) and RI(s) obtained for all NZP CSI-RS AP group(s) or selected NZP CSI-RS AP group(s). Herein, PMI and CQI are values obtained for wideband or subband. The terminal reports the above-obtained CQI, PMI, and RI to the base station.

Meanwhile, a plurality of NZP CSI-RS resources may be configured in one CSI process in the first CSI-RS mode and the second CSI-RS mode. It is difficult for the terminal to distinguish the first CSI-RS mode and the second CSI-RS mode only by receiving CSI-RS AP according to the configured NZP CSI-RS resources. Meanwhile, the terminal performs CSI measurements of as many as the number of all CSI-RS APs configured over the plurality of NZP CSI-RS resources in the first CSI-RS mode, whereas the terminal measures CSI for each NZP CSI-RS resource or at least one selected NZP CSI-RS resource in the second CSI-RS mode. Therefore, in order for the terminal to perform CSI measurement and report in a CSI-RS mode intended by the base station, it is necessary to signal which CSI-RS mode (or CSI reporting class) is required for CSI measurement and report in a CSI process to the terminal. For such a purpose or other purposes, a CSI process configuration may include CSI-RS mode (or CSI reporting class) configuration information. The base station includes the CSI-RS mode (or CSI reporting class) configuration information in the CSI process configuration with which the terminal is configured through higher-layer signaling. The terminal configured with the CSI process configuration performs CSI measurement and report for the corresponding CSI-RS mode (or CSI reporting class).

6. Measurement Restriction Method

The terminal measuring CSI measures a channel suffered when a physical channel (or signal) having the terminal as a receiving target is transmitted from a serving cell (or base station), and measures interference from another cell (or base station) and/or interference due to a physical channel (or signal) not having the terminal as the receiving target from the serving cell (or base station). Hereinafter, the former is referred to as channel measurement, and the latter is referred to as interference measurement.

Meanwhile, measurement restriction (MR) means performing channel measurement or interference measurement only in a limited interval (in time domain and/or frequency domain). The base station that operates the above-described second CSI-RS mode may change a beam applied to CSI-RS AP over time due to change in a channel or change in terminals that share the CSI-RS resource.

A method to apply MR in the time domain is described with reference to FIGS. 3A and 3B. In more detail, FIG. 3A shows a case where an explicit measurement reset is not configured, and FIG. 3B shows a case where the explicit measurement reset is configured.

Figure 3A:
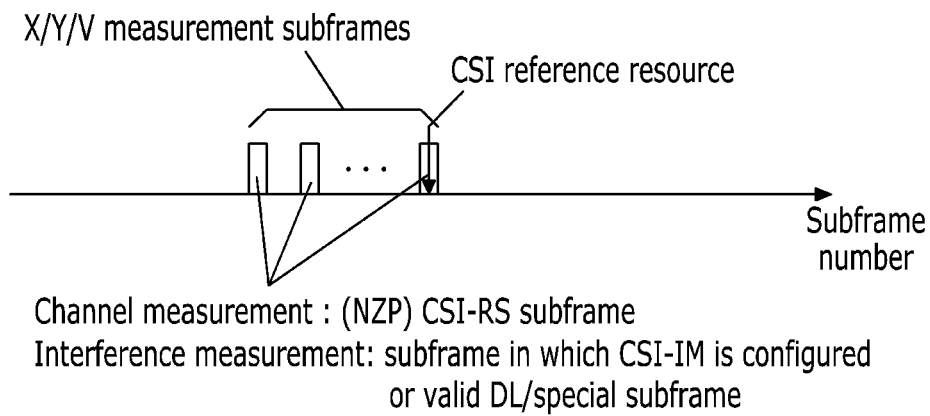
FIGS. 3A and 3B are diagrams for describing a CSI measurement restriction method applied in a time domain according to an exemplary embodiment of the present invention.
Figure 3B:
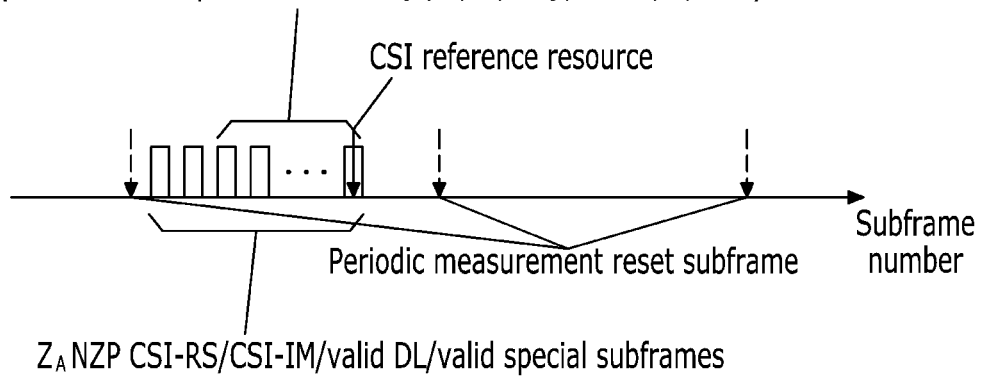

As shown in FIG. 3A, the terminal measures a channel used to calculate CSI in X number of NZP CSI-RS subframes (including CSI reference resource) until the CSI reference resource. The terminal measures interference used to calculate CSI in Y number of CSI-IM subframes (including CSI reference resource) until the CSI reference resource when CSI-IM is configured and in V number of valid DL or special subframes (including CSI reference resource) until the CSI reference resource when CSI-IM is not configured.

Whether to apply MR may be configured through higher-layer signaling. MR for channel measurement and MR for interference measurement may be independently configured. A value of each of X, Y, and V may be defined as a fixed value (method M600), may be configured through higher-layer signaling, or may be determined within a predetermined range by the terminal (method M601).

A method in which the terminal determines the value of each of X, Y, and V within a predetermined range is described with reference to FIG. 3B. For example, the predetermined range for X may be 1-$Z_X$, the predetermined range for Y may be 1-$Z_Y$, and the predetermined range for V may be 1-$Z_V$. Herein, $Z_X$, $Z_Y$, and $Z_V$ may be the number of CSI-RS subframes between a subframe in which most recent measurement is reset and a CSI reference resource (in more detail, an interval from the subframe in which most recent measurement is reset to a subframe to which the CSI reference resource belongs). A period and an offset may be configured through higher-layer signaling such that a subframe of which measurement is reset (measurement reset subframe) is regularly repeated. As an example in this regard, in a case where the subframe of which most recent measurement is reset is the 5-th subframe of the 10-th frame, the CSI reference resource is the 5-th subframe of the 15-th frame, and a period of an NZP CSI-RS subframe (in the MR for channel measurement) or a CSI-IM subframe (in the MR for interference measurement) is 5 subframes, $Z_X$ or $Z_Y$ may be 10, and the terminal selects one of numbers 1~10 as a value of X or Y (W of FIG. 3B denotes the selected value) and applies the selected value to the MR for channel measurement or interference measurement.

In a case where the above-described periodic measurement reset is configured (method M602), the base station may change beam(s) applied to CSI-RS AP(s) that belong to the CSI-RS resource in the subframe in which measurement is reset or to the most recent NZP CSI-RS subframe (in the MR for channel measurement) previous to the subframe in which measurement is reset. Alternatively, in a case where the above-described periodic measurement reset is configured, the base station may change the beam(s) applied to the CSI-RS AP(s) that belong to the CSI-RS resource in the CSI-IM subframe (in the MR for interference measurement). The terminal may not expect that a period of a measurement reset (hereinafter referred to as 'first measurement reset') for PUCCH-based periodic CSI reporting is configured to be smaller than a beam selection reporting period. A value of an integer multiple may be included in higher-layer signaling as a period configuration parameter of the first measurement reset such that the period of the first measurement reset is the integer multiple of the beam selection reporting period. Alternatively, the period of the first measurement reset is not explicitly configured and may be defined to be the same as the beam selection reporting period or may be defined as an integer multiple (predetermined integer multiple) of the beam selection reporting period. Alternatively, a subframe of the first measurement reset may be defined as beam selection reporting subframe.

In system perspectives, a BF CSI-RS resource (this may be defined as an NZP CSI-RS resource or an NZP CSI-RS AP group in the above-described '5. CSI process configuration method') may be shared by a plurality of terminals, and the terminal may be configured with a plurality of BF CSI-RS resources. In this case, when the base station configures the MR or CSI process through higher-layer signaling, information regarding the X, Y, and V and/or measurement reset configuration (period and/or offset of measurement reset subframe) for each BF CSI-RS resource (or each CSI-RS AP group corresponding to a beam) may be included in MR configuration or CSI process configuration. For example, in a case where a first terminal is configured with 2 BF CSI-RS resources, a first BF CSI-RS resource among BF CSI-RS resources is shared by the first terminal and a second terminal, and a second BF CSI-RS resource is shared by the first terminal and a third terminal, X for the first BF CSI-RS resource may be configured as 2, and X for the second BF CSI-RS resource may be configured as 4.

An exemplary embodiment in which MR is used may include the following. In '5. CSI process configuration method', MR may not be applied to channel measurement of the first CSI-RS mode, and the method M600 with Y=1 may be applied to interference measurement. The method M600 with Y=1 may be applied to channel measurement of the second CSI-RS mode, and the method M600 with Y=1 may be applied to interference measurement.

In configuring a plurality of CSI processes, in a case where aperiodic CSI reports for the plurality of CSI processes are configured to be requested by the base station simultaneously, and MR is configured for all the corresponding CSI processes, the terminal may not expect that CSI-RS for the aperiodic CSI reports of the corresponding CSI processes is configured through the same CSI-RS resource configuration.

7. Base Station and Terminal that Perform the above-described Methods

Figure 4:
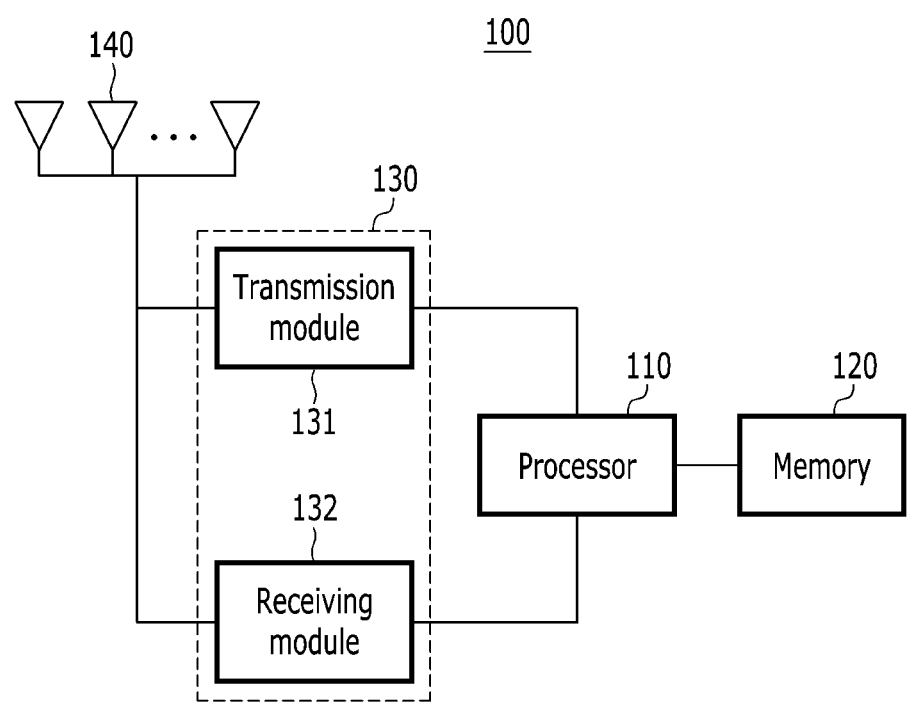
FIG. 4 is a diagram of a base station according to an exemplary embodiment of the present invention.

FIG. 4 is a diagram of a base station 100 that transmits CSI-RS according to an exemplary embodiment of the present invention.

The base station 100 of FIG. 4 includes an RF (radio frequency) converter 130, a processor 110, a memory 120, and an antenna module 140.

The processor 110 may be configured to implement a function, a procedure, and methods that are described with regard to the base station in the present specification. The processor 110 may also control each of constitutional elements of the base station 100.

The memory 120 is connected to the processor 110 and stores various pieces of information relating to an operation of the processor 110.

The RF converter 130 is connected to the processor 110 and transmits or receives a wireless signal. The RF converter 130 includes a transmission module 131 and a receiving module 132.

The base station 100 receives a CSI report from a terminal through the receiving module 132.

The base station 100 stores information necessary for CSI-RS configuration, information necessary for CSI measurement and report configuration, and/or configured information in the memory 120. The base station 100 stores CSI reported from the terminal in the memory 120.

The base station 100 performs CSI-RS configuration and CSI measurement & report configuration that are suitable for the terminal according to the methods described in the present specification through the processor 110.

The base station 100 transmits the CSI-RS configuration information, the CSI measurement & report configuration information, and CSI-RS according to the CSI-RS configuration information, the CSI measurement & report configuration information through the transmission module 130.

Figure 5:
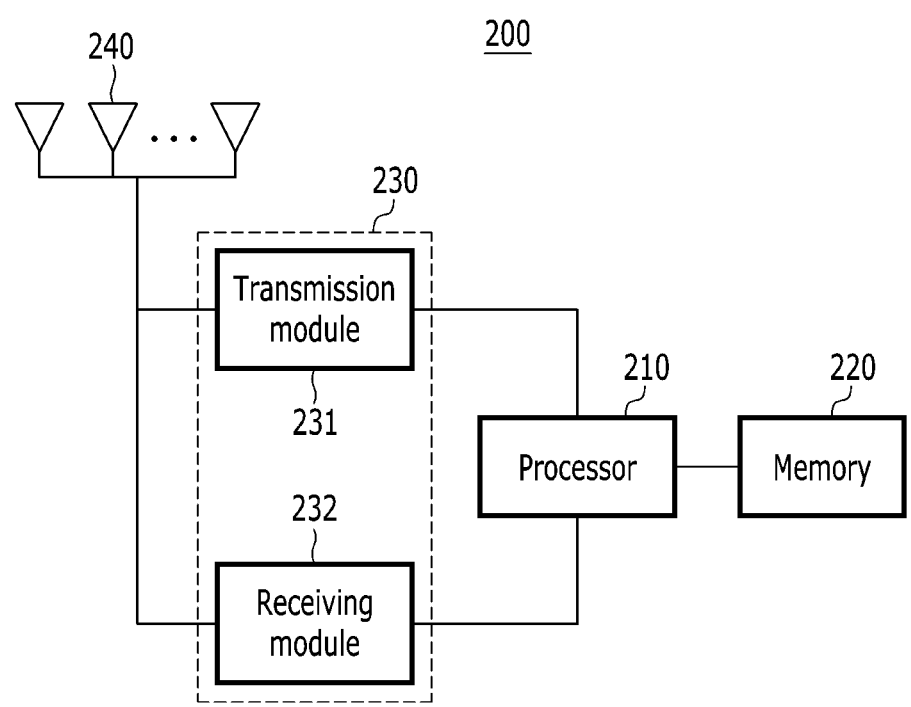
FIG. 5 is a diagram of a terminal according to an exemplary embodiment of the present invention.

FIG. 5 is a diagram of a terminal 200 that measures and reports CSI according to an exemplary embodiment of the present invention.

The terminal 200 of FIG. 5 includes an RF converter 230, a processor 210, a memory 220, and an antenna module 240.

The processor 210 may be configured to implement a function, a procedure, and methods that are described with regard to the terminal in the present specification. The processor 210 may also control each of constitutional elements of the terminal 200.

The memory 220 is connected to the processor 210 and stores various pieces of information relating to an operation of the processor 210.

The RF converter 230 is connected to the processor 210 and transmits or receives a wireless signal. The RF converter 230 includes a transmission module 231 and a receiving module 232.

The terminal 200 receives CSI-RS configuration information, CSI measurement & report configuration information, and CSI-RS according to the CSI-RS configuration information and the CSI measurement & report configuration information from the base station 100 through the receiving module 232.

The terminal 200 stores the received CSI-RS configuration information and CSI measurement and report configuration information in the memory 220.

The terminal 200 measures CSI from CSI-RS according to the methods described in the present specification through the processor 210. The terminal 200 stores the measured CSI in the memory 220.

The terminal 200 reports the CSI stored in the memory 220 according to the methods described in the present specification through the processor 210.

The terminal 200 transmits the CSI that is to be reported to the base station 100 through the transmission module 231.

According to an exemplary embodiment of the present invention, a method and apparatus for transmitting CSI-RS for FD-MIMO transmission using multiple antennas and a method and apparatus for measuring and reporting CSI using the CSI-RS may be provided.

According to an exemplary embodiment of the present invention, CSI-RS may be effectively transmitted and CSI may be effectively measured and reported in consideration of overhead, system performance, a 2D antenna array structure, and channel characteristics in this regard.

According to an exemplary embodiment of the present invention, system performance of FD-MIMO may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for configuring a CSI (channel state information) process to a terminal by a base station in a MIMO (multiple input multiple output) antenna system, the method comprising:
   when a first CSI-RS (CSI-reference signal) mode is operated, including a plurality of first identifiers indicating a plurality of first CSI-RS resource configurations and a plurality of second identifiers each forming a pair with each of the plurality of first identifiers and indicating a plurality of first CSI-IM (CSI-interference measurement) resource configurations in first CSI process configuration information;
   transmitting the first CSI process configuration information to the terminal; and
   receiving first CSI measured by the terminal according to the first CSI process configuration information from the terminal.

2. The method of claim 1, wherein a first CSI-RS and a second CSI-RS transmitted on a same CSI-RS resource configured in the first CSI process configuration information are beamformed with the same beam direction, and a third CSI-RS and a fourth CSI-RS transmitted on different CSI-RS resources configured in the first CSI process configuration information are beamformed with different beam directions, when the first CSI-RS mode is operated.

3. The method of claim 1, wherein the receiving of the first CSI measured by the terminal according to the first CSI process configuration information includes:
   receiving a single third identifier corresponding to a first CSI-RS resource among a plurality of CSI-RS resources corresponding to the plurality of first identifiers, or a plurality of fourth identifiers corresponding to a plurality of second CSI-RS resources among the plurality of CSI-RS resources corresponding to the plurality of first identifiers.

4. The method of claim 3, wherein the first CSI-RS resource is corresponding to a single first beam selected by the terminal, and the plurality of second CSI-RS resources are corresponding to a plurality of second beams selected by the terminal.

5. The method of claim 1, further comprising:
   when a second CSI-RS mode is operated, including a plurality of fifth identifiers indicating a plurality of second CSI-RS resource configurations and a sixth identifier indicating one second CSI-IM resource configuration in second CSI process configuration information;
   transmitting the second CSI process configuration information to the terminal; and
   receiving second CSI measured by the terminal according to the second CSI process configuration information from the terminal.

6. The method of claim 5, wherein a plurality of CSI-RSs transmitted on a plurality of CSI-RS resources configured in the second CSI process configuration information are beamformed with the same beam width and direction, when the second CSI-RS mode is operated.

7. The method of claim 5, further comprising:
   selecting one of the first CSI-RS mode and the second CSI-RS mode, and
   operating the selected mode.

8. A method for reporting CSI to a base station by a terminal in a MIMO antenna system, the method comprising:
   receiving first CSI process configuration information including a plurality of first identifiers indicating a plurality of first CSI-RS resource configurations and a plurality of second identifiers each forming a pair with each of the plurality of first identifiers and indicating a plurality of first CSI-IM resource configurations, when a first CSI-RS mode is operated at the base station;
   measuring first CSI according to the first CSI process configuration information; and
   reporting a single third identifier corresponding to a first CSI-RS resource among a plurality of CSI-RS resources corresponding to the plurality of first identifiers and the first CSI for the first CSI-RS resource, or a plurality of fourth identifiers corresponding to a plurality of second CSI-RS resources among the plurality of CSI-RS resources corresponding to the plurality of first identifiers and the first CSI for the plurality of second CSI-RS resources, according to the first CSI process configuration information, to the base station.

9. The method of claim 8, wherein a first CSI-RS and a second CSI-RS transmitted on a same CSI-RS resource configured in the first CSI process configuration information are beamformed with the same beam direction, and a third CSI-RS and a fourth CSI-RS transmitted on different CSI-RS resources configured in the first CSI process configuration information are beamformed with different beam directions, when the first CSI-RS mode is operated.

10. The method of claim 8, wherein the measuring of the first CSI according to the first CSI process configuration information includes:
 measuring PMI, RI and CQI for the first CSI-RS resource corresponding to the single third identifier or for the plurality of second CSI-RS resources corresponding to the plurality of fourth identifiers.

11. The method of claim 10, wherein the single third CSI-RS resource is corresponding to a single selected beam, and the plurality of fourth CSI-RS resources is corresponding to a plurality of selected beams.

12. The method of claim 10, wherein the transmitting of the first CSI measured according to the first CSI process configuration information includes:
 when the single third identifier is reported, transmitting the single third identifier and the first CSI for the single third identifier to the base station; and
 when the plurality of fourth identifiers is reported, transmitting a bitmap indicating the plurality of fourth identifiers and the first CSI for the plurality of fourth identifiers to the base station.

13. The method of claim 8, further comprising:
 receiving, from the base station, second CSI process configuration information from the base station including a plurality of fifth identifiers indicating a plurality of second CSI-RS resource configurations and a sixth identifier indicating one second CSI-IM resource configuration, when a second CSI-RS mode is operated at the base station;
 measuring second CSI according to the second CSI process configuration information; and
 transmitting the second CSI according to the second CSI process configuration information to the base station.

14. The method of claim 13, wherein a plurality of CSI-RSs transmitted on a plurality of CSI-RS resources configured in the second CSI process configuration information are beamformed with the same beam width and direction, when the second CSI-RS mode is operated.

15. The method of claim 12, further comprising:
 assuming that QCL (quasi co-location) with respect to all or some of Doppler shift, Doppler spread, average delay, and delay spread is satisfied between at least one DM-RS (demodulation reference signal) antenna port and at least one first CSI-RS resources that belongs to at least one CSI-RS resource indicated by the single third identifier or the plurality of fourth identifier transmitted to the base station.

16. The method of claim 12, further comprising:
 assuming that QCL with respect to all or some of Doppler shift, Doppler spread, average delay, and delay spread is satisfied between at least one first DM-RS antenna port and at least one first CSI-RS resource that belongs to at least one CSI-RS resource indicated by the single third identifier or the plurality of fourth identifiers transmitted to the base station, for a CSI process corresponding to QCL information configured to the terminal through physical layer signaling from the base station for receiving a PDSCH (physical downlink shared channel), and
 wherein the at least one first DM-RS antenna port belongs to PDSCH transmission resources allocated by a DL (downlink) DCI (downlink control information) including the QCL information.

\* \* \* \* \*